(12) United States Patent
Wang

(10) Patent No.: US 12,081,381 B2
(45) Date of Patent: Sep. 3, 2024

(54) METHOD AND APPARATUS FOR HANDLING NUMEROLOGY CHANGE

(71) Applicant: Telefonaktiebolaget LM Ericsson (publ), Stockholm (SE)

(72) Inventor: Min Wang, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 71 days.

(21) Appl. No.: 17/926,346

(22) PCT Filed: Mar. 24, 2021

(86) PCT No.: PCT/EP2021/057552
§ 371 (c)(1),
(2) Date: Nov. 18, 2022

(87) PCT Pub. No.: WO2021/233596
PCT Pub. Date: Nov. 25, 2021

(65) Prior Publication Data
US 2023/0353433 A1 Nov. 2, 2023

(30) Foreign Application Priority Data

May 20, 2020 (WO) ................ PCT/EP2020/064164

(51) Int. Cl.
*H04L 27/26* (2006.01)
*H04L 1/1812* (2023.01)
*H04W 74/0808* (2024.01)

(52) U.S. Cl.
CPC ...... *H04L 27/26025* (2021.01); *H04L 1/1812* (2013.01); *H04W 74/0808* (2013.01)

(58) Field of Classification Search
CPC .......... H04L 27/26025; H04L 27/2602; H04L 27/2603; H04L 1/1812; H04L 1/1816;
(Continued)

(56) References Cited

U.S. PATENT DOCUMENTS

2018/0376474 A1* 12/2018 Khoryaev ............. H04L 1/0007
2019/0373588 A1* 12/2019 Bae ........................ H04L 5/0044
(Continued)

FOREIGN PATENT DOCUMENTS

CN 108924854 A 11/2018
CN 111181693 A 5/2020
(Continued)

OTHER PUBLICATIONS

Author Unknown, "Technical Specification Group Radio Access Network; NR; Requirements for support of radio resource management (Release 16)," Technical Specification 38.133, Version 16.3.0, Mar. 2020, 3GPP Organizational Partners, 1169 pages.
(Continued)

*Primary Examiner* — Khanh C Tran
(74) *Attorney, Agent, or Firm* — Withrow & Terranova, PLLC

(57) ABSTRACT

Embodiments of the present disclosure provide methods and apparatus for handling numerology change. A method implemented at a terminal device comprises determining a change from a first numerology to a second numerology. The method further comprises transmitting a pending transmission block, TB, using a first configured grant configuration associated with the first numerology, or using a second configured grant configuration associated with the second numerology.

20 Claims, 22 Drawing Sheets

(58) Field of Classification Search
CPC ............... H04L 1/1819; H04L 1/1825; H04W 74/0808; H04W 74/0816; H04W 74/0825
See application file for complete search history.

(56) References Cited

U.S. PATENT DOCUMENTS

| | | | | |
|---|---|---|---|---|
| 2020/0037345 | A1* | 1/2020 | Ryoo | ............... H04W 74/0833 |
| 2021/0288856 | A1* | 9/2021 | Liu | ................... H04L 27/26025 |
| 2022/0095278 | A1* | 3/2022 | Kim | ......................... H04L 5/00 |

FOREIGN PATENT DOCUMENTS

| | | |
|---|---|---|
| EP | 3606200 A1 | 2/2020 |
| WO | 2019139516 A1 | 7/2019 |

OTHER PUBLICATIONS

Author Unknown, "Technical Specification Group Radio Access Network; NR; Physical layer procedures for control (Release 16)," Technical Specification 38.213, Version 16.1.0, Mar. 2020, 3GPP Organizational Partners, 156 pages.
Author Unknown, "Technical Specification Group Radio Access Network; NR; Medium Access Control (MAC) protocol specification (Release 16)," Technical Specification 38.321, Version 16.0.0, Mar. 2020, 3GPP Organizational Partners, 141 pages.
Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 832 pages.
CMCC, "R2-1701927: HARQ Entity over Multiple Numerologies," 3GPP TSG-RAN WG2 Meeting #97, Feb. 13-17, 2017, Athens, Greece, 2 pages.
Intel Corporation, "RP-193259: New SID: Study on supporting NR from 52.6GHz to 71 Ghz," 3GPP TSG RAN Meeting #86, Dec. 9-12, 2019, Sitges, Spain, 3 pages.
Interdigital, "R2-1812355: Bwp switching during running DRX timers," 3GPP TSG-RAN WG2 Meeting #103, Aug. 20-24, 2018, Gothenburg, Sweden, 3 pages.
Mediatek Inc., "R2-1713077: Handle ongoing HARQ process when BWP switching occurs," 3GPP TSG-RAN WG2 Meeting #100, Nov. 27-Dec. 1, 2017, Reno, Nevada, 2 pages.
Samsung, "R2-1703453: HARQ for Numerology Multiplexing," 3GPP TSG-RAN WG2 NR #97b Meeting, Apr. 3-7, 2017, Spokane, Washington, 4 pages.
International Search Report and Written Opinion for International Patent Application No. PCT/EP2021/057552, mailed Jun. 9, 2021, 16 pages.
First Office Action for Chinese Patent Application No. 202180036428.X, mailed Apr. 3, 2024, 21 pages.
Soni, et al., "Adaptive Numerology—A solution to address the demanding QoS in 5G-V2X," IEEE Wireless Communications and Networking Conference, Apr. 15, 2018, 6 pages.
Examination Report for European Patent Application No. 21713954.2, mailed May 6, 2024, 7 pages.

* cited by examiner

502

For the pending TB, stopping a first timer and a second timer according to the first configured grant configuration which needs to be cleared, wherein the first timer is configured to indicate a maximum amount of time for the terminal device to transmit and retransmit a TB associated with a hybrid automatic repeat request, HARQ, process using a configured grant and the second timer is configured to indicate an autonomous retransmission time interval of configured grant for the HARQ process

504

For the pending TB, restarting the first timer and the second timer according to the second configured grant configuration, wherein timer values of the first timer and the second timer according to the second configured grant configuration are set according to one of:

- the timer values of the first timer and the second timer according to the second configured grant configuration are set as corresponding values configured in the second configured grant configuration; or

- the timer values of the first timer and the second timer according to the second configured grant configuration are set as the corresponding values configured in the second configured grant configuration minus corresponding elapsed time values of the first timer and the second timer according to the first configured grant configuration

For the pending TB, stopping a first timer and a second timer according to the first configured grant configuration which needs to be suspended, wherein the first timer is configured to indicate a maximum amount of time for the terminal device to transmit and retransmit a TB associated with a hybrid automatic repeat request, HARQ, process using a configured grant and the second timer is configured to indicate an autonomous retransmission time interval of configured grant for the HARQ process

604

For the pending TB, restarting the first timer and the second timer after the suspended first configured grant configuration is resumed, wherein respective timer values of the first timer and the second timer according to the first configured grant configuration are updated by excluding a suspension period of the first configured grant configuration associated with the first numerology

When the pending TB has been transmitted using the first configured grant configuration, the pending TB is to be transmitted using the second configured grant configuration, the first configured grant configuration is configured without repetition and the second configured grant configuration is configured with repetition, applying the repetition to transmit the pending TB in the second configured grant configuration

704

When the pending TB has been transmitted using the first configured grant configuration, the pending TB is to be transmitted using the second configured grant configuration, the first configured grant configuration is configured with repetition and the second configured grant configuration is configured with repetition, applying the repetition to transmit the pending TB in the second configured grant configuration

706

When the pending TB has been transmitted using the first configured grant configuration, the pending TB is to be transmitted using the second configured grant configuration, the first configured grant configuration is configured with repetition and the second configured grant configuration is configured without repetition, disabling the repetition to transmit the pending TB in the second configured grant configuration

Retransmitting the pending TB using the first configured grant configuration associated with the first numerology

Transmitting, to a network node, a notification regarding the pending TB

724

Transmitting capability information of the terminal device,
  wherein the capability information comprises a capability bit indicating whether the terminal device supports to transmit the pending TB using the second configured grant configuration associated with the second numerology

When the pending TB has been transmitted using the first configured grant configuration, the pending TB is to be transmitted using the second configured grant configuration, the first configured grant configuration is configured without repetition and the second configured grant configuration is configured with repetition, applying the repetition to receive the pending TB in the second configured grant configuration

814

When the pending TB has been transmitted using the first configured grant configuration, the pending TB is to be transmitted using the second configured grant configuration, the first configured grant configuration is configured with repetition and the second configured grant configuration is configured with repetition, applying the repetition to receive the pending TB in the second configured grant configuration

816

When the pending TB has been transmitted using the first configured grant configuration, the pending TB is to be transmitted using the second configured grant configuration, the first configured grant configuration is configured with repetition and the second configured grant configuration is configured without repetition, disabling the repetition to receive the pending TB in the second configured grant configuration

FIG. 8b

METHOD AND APPARATUS FOR HANDLING NUMEROLOGY CHANGE

This application is a 35 U.S.C. § 371 national phase filing of International Application No. PCT/EP2021/057552, filed Mar. 24, 2021, which claims the benefit of International Application No. PCT/EP2020/064164, filed May 20, 2020, the disclosures of which are incorporated herein by reference in their entireties.

TECHNICAL FIELD

The present disclosure relates generally to the technology of wireless communication, and in particular, to methods and apparatuses for handling numerology change.

BACKGROUND

This section introduces aspects that may facilitate better understanding of the present disclosure. Accordingly, the statements of this section are to be read in this light and are not to be understood as admissions about what is in the prior art or what is not in the prior art.

Long Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communication (MTC), ultra-reliable low latency communications (URLLC), side-link device-to-device (D2D), and several other use cases, too.

In NR, the basic scheduling unit is called a slot. A slot consists of 14 Orthogonal Frequency Division Multiplex (OFDM) symbols for the normal cyclic prefix configuration. NR supports many different subcarrier spacing configurations and at a subcarrier spacing of 30 kHz the OFDM symbol duration is ~33 us. As an example, a slot with 14 symbols for the same subcarrier-spacing (SCS) is 500 us long (including cyclic prefixes).

NR also supports flexible bandwidth configurations for different user equipments (UEs) on the same source cell. In other words, the bandwidth monitored by a UE and used for its control and data channels may be smaller than the carrier bandwidth. One or multiple bandwidth part configurations for each component carrier can be semi-statically signaled to a UE, where a bandwidth part, BWP, consists of a group of contiguous physical resource blocks, PRBs. Reserved resources can be configured within the bandwidth part. The bandwidth of a bandwidth part equals to or is smaller than the maximal bandwidth capability supported by a UE.

NR is targeting both licensed and unlicensed bands. Allowing unlicensed networks, i.e., networks that operate in shared spectrum (or unlicensed spectrum) to effectively use the available spectrum is an attractive approach to increase system capacity. Although unlicensed spectrum does not match the qualities of the licensed regime, solutions that allow an efficient use of it as a complement to licensed deployments have the potential to bring great value to the 3GPP operators, and, ultimately, to the 3GPP industry as a whole. It is expected that some features in NR will need to be adapted to comply with the special characteristics of the unlicensed band as well as also different regulations. A subcarrier spacing of 15 or 30 kHz are the most promising candidates for NR-U OFDM numerologies for frequencies below 6 GHz.

Operating in unlicensed spectrum regularly requires to sense the medium as free before transmitting data. This operation is often referred to as listen before talk, LBT. There are many different implementations of LBT, depending on which radio technology the device uses and which type of data is to be transmitted. Usually, the sensing is done in a particular channel (corresponding to a defined carrier frequency and over a predefined bandwidth). For example, in the 5 GHz band, the sensing is done over 20 MHz channels.

Many devices are capable of transmitting (and receiving) over a wide bandwidth including multiple sub-bands/channels, e.g., LBT sub-band (i.e., the frequency part with bandwidth equals to LBT bandwidth). A device is only allowed to transmit on the sub-bands where the medium is sensed as free. Again, there are different flavors of how the sensing should be done when multiple sub-bands are involved.

In principle, there are two ways to operate over multiple sub-bands. One way is that the transmitter/receiver bandwidth is changed depending on the sub-bands that were sensed as free. This way can be regarded as to have only one component carrier (CC); the multiple sub-bands may be treated as single channel with a larger bandwidth. The other way is that the device operates almost independent processing chains for each channel. Depending on how independent the processing chains are, this way can be referred to as either carrier aggregation (CA) or dual connectivity (DC).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for handling numerology change.

A first aspect of the present disclosure provides a method implemented at a terminal device. The method comprises determining a change from a first numerology to a second numerology. The method further comprises transmitting a pending transmission block, TB, using a first configured grant configuration associated with the first numerology, or using a second configured grant configuration associated with the second numerology.

In embodiments of the present disclosure, the first configured grant configuration may provide a first size for an initial TB, the second configured grant configuration may provide a second size for the pending TB, and the first size is the same as the second size, or the first size is different from the second size. The initial TB is transmitted using the first configured grant configuration associated with the first numerology.

In embodiments of the present disclosure, the method may further comprise receiving a message indicating the change from the first numerology to the second numerology.

In embodiments of the present disclosure, the change from the first numerology to the second numerology may be determined based on the message or consistent listen before talk, LBT, failure.

In embodiments of the present disclosure, the method may further comprise performing rate matching to fit the second size when the first size is different from the second size.

In embodiments of the present disclosure, after transmitting the pending TB using the second configured grant configuration associated with the second numerology, the method may further comprise clearing the first configured grant configuration.

In embodiments of the present disclosure, the second configured grant configuration may be able to fulfil a quality of service, QoS, requirement of the pending TB.

In embodiments of the present disclosure, a hybrid automatic repeat request, HARQ, process associated with the pending TB may be reused after changing from the first numerology to the second numerology.

In embodiments of the present disclosure, a hybrid automatic repeat request, HARQ, process associated with the pending TB may be changed from a first HARQ process to a second HARQ process after changing from the first numerology to the second numerology.

In embodiments of the present disclosure, when the HARQ process associated with the pending TB is changed from the first HARQ process to the second HARQ process after changing from the first numerology to the second numerology, the method may further comprise dropping the pending TB and triggering an upper layer retransmission; or copying the pending TB from the first HARQ process to the second HARQ process and dropping the pending TB in the first HARQ process.

In embodiments of the present disclosure, the method may further comprise, for the pending TB, stopping a first timer and a second timer according to the first configured grant configuration which needs to be cleared, wherein the first timer is configured to indicate a maximum amount of time for the terminal device to transmit and retransmit a TB associated with a hybrid automatic repeat request, HARQ, process using a configured grant and the second timer is configured to indicate an autonomous retransmission time interval of configured grant for the HARQ process; and/or for the pending TB, restarting the first timer and the second timer according to the second configured grant configuration. Timer values of the first timer and the second timer according to the second configured grant configuration are set according to one of:

the timer values of the first timer and the second timer according to the second configured grant configuration are set as corresponding values configured in the second configured grant configuration; or the timer values of the first timer and the second timer according to the second configured grant configuration are set as the corresponding values configured in the second configured grant configuration minus corresponding elapsed time values of the first timer and the second timer according to the first configured grant configuration.

In embodiments of the present disclosure, the method may further comprise, for the pending TB, stopping a first timer and a second timer according to the first configured grant configuration which needs to be suspended, wherein the first timer is configured to indicate a maximum amount of time for the terminal device to transmit and retransmit a TB associated with a hybrid automatic repeat request, HARQ, process using a configured grant and the second timer is configured to indicate an autonomous retransmission time interval of configured grant for the HARQ process; and/or for the pending TB, restarting the first timer and the second timer after the suspended first configured grant configuration is resumed. Respective timer values of the first timer and the second timer according to the first configured grant configuration may be updated by excluding a suspension period of the first configured grant configuration associated with the first numerology.

In embodiments of the present disclosure, the method may further comprise, when the pending TB has been transmitted using the first configured grant configuration, the pending TB is to be transmitted using the second configured grant configuration, the first configured grant configuration is configured without repetition and the second configured grant configuration is configured with repetition, applying the repetition to transmit the pending TB in the second configured grant configuration.

In embodiments of the present disclosure, in the second configured grant configuration, the pending TB may be transmitted based on one of a configured repetition number in the second configured grant configuration; a repetition number calculated by the configured repetition number in the second configured grant configuration minus one;

a repetition number configured by a network node; or a repetition number configured by the terminal device.

In embodiments of the present disclosure, the method may further comprise, when the pending TB has been transmitted using the first configured grant configuration, the pending TB is to be transmitted using the second configured grant configuration, the first configured grant configuration is configured with repetition and the second configured grant configuration is configured with repetition, applying the repetition to transmit the pending TB in the second configured grant configuration.

In embodiments of the present disclosure, in the second configured grant configuration, the pending TB may be transmitted based on one of a configured repetition number in the second configured grant configuration; or a repetition number calculated by the configured repetition number in the second configured grant configuration minus a repetition number that the pending TB has been transmitted in the first configured grant configuration.

In embodiments of the present disclosure, the method may further comprise, when the pending TB has been transmitted using the first configured grant configuration, the pending TB is to be transmitted using the second configured grant configuration, the first configured grant configuration is configured with repetition and the second configured grant configuration is configured without repetition, disabling the repetition to transmit the pending TB in the second configured grant configuration.

In embodiments of the present disclosure, the pending TB may be transmitted using the first configured grant configuration associated with the first numerology when the first configured grant configuration is a first type of configured grant configuration.

In embodiments of the present disclosure, the first type of configured grant configuration may comprises configured grant Type 1.

In embodiments of the present disclosure, after the change from the first numerology to the second numerology has completed, the method may further comprise retransmitting the pending TB using the first configured grant configuration associated with the first numerology.

In embodiments of the present disclosure, the method may further comprise transmitting, to a network node, a notification regarding the pending TB.

In embodiments of the present disclosure, the notification regarding the pending TB comprises at least one of: a size of the pending TB; information regarding a hybrid automatic repeat request, HARQ, process associated with the pending TB in the first configured grant configuration which was cleared; information regarding the HARQ process associated with the pending TB in the first configured grant configuration which was suspended; information regarding the second configured grant configuration, wherein the pending TB is to be transmitted using the second configured grant configuration; or information regarding the HARQ process to be used for retransmission of the pending TB after the change from the first numerology to the second numerology.

In embodiments of the present disclosure, the notification regarding the pending TB may be transmitted to the network node via at least one of a random access channel, RACH, message; a physical uplink control channel, PUCCH, transmission; a physical uplink shared channel, PUSCH, based transmission; or a sounding reference signal, SRS, transmission.

In embodiments of the present disclosure, the terminal device may be configured with multiple configured grant configurations, and at least one of the configured grant configuration may be associated with at least one numerology.

In embodiments of the present disclosure, an association between a configured grant configuration and a numerology may be configured explicitly or inexplicitly.

In embodiments of the present disclosure, an index of a numerology may be included in a configured grant configuration.

In embodiments of the present disclosure, one or more configured grant configurations may be configured for a bandwidth part, BWP, and the BWP is configured with at least one numerology; and/or one or more configured grant configurations are configured for a cell and the cell is configured with at least one numerology; and/or a BWP segment is configured with at least one numerology.

In embodiments of the present disclosure, numerology may comprise at least one of a sub-carrier spacing, SCS, a symbol duration, or a cyclic prefix, CP, length.

In embodiments of the present disclosure, the method may further comprise transmitting capability information of the terminal device. The capability information may comprise a capability bit indicating whether the terminal device supports to transmit the pending TB using the second configured grant configuration associated with the second numerology.

A second aspect of the present disclosure provides a method implemented at a network node. The method comprises receiving a pending transmission block, TB, from a terminal device. The pending TB is transmitted using a first configured grant configuration associated with a first numerology, or using a second configured grant configuration associated with a second numerology.

In embodiments of the present disclosure, the method may further comprise transmit a message indicating a change from the first numerology to the second numerology to the terminal device.

In embodiments of the present disclosure, a first timer is configured to indicate a maximum amount of time for the terminal device to transmit and retransmit a TB associated with a hybrid automatic repeat request, HARQ, process using a configured grant and a second timer is configured to indicate an autonomous retransmission time interval of configured grant for the HARQ process. Timer values of the first timer and the second timer according to the second configured grant configuration may be set according to one of the timer values of the first timer and the second timer according to the second configured grant configuration are set as corresponding values configured in the second configured grant configuration; or the timer values of the first timer and the second timer according to the second configured grant configuration are set as the corresponding values configured in the second configured grant configuration minus corresponding elapsed time values of the first timer and the second timer according to the first configured grant configuration.

In embodiments of the present disclosure, a first timer is configured to indicate a maximum amount of time for the terminal device to transmit and retransmit a TB associated with a hybrid automatic repeat request, HARQ, process using a configured grant and a second timer is configured to indicate an autonomous retransmission time interval of configured grant for the HARQ process. Respective timer values of the first timer and the second timer according to the first configured grant configuration may be updated by excluding a suspension period of the first configured grant configuration associated with the first numerology.

In embodiments of the present disclosure, the method may further comprise, when the pending TB has been transmitted using the first configured grant configuration, the pending TB is to be transmitted using the second configured grant configuration, the first configured grant configuration is configured without repetition and the second configured grant configuration is configured with repetition, applying the repetition to receive the pending TB in the second configured grant configuration.

In embodiments of the present disclosure, in the second configured grant configuration, the pending TB may be received based on one of a configured repetition number in the second configured grant configuration; a repetition number calculated by the configured repetition number in the second configured grant configuration minus one; a repetition number configured by a network node; or a repetition number configured by the terminal device.

In embodiments of the present disclosure, the method may further comprise, when the pending TB has been transmitted using the first configured grant configuration, the pending TB is to be transmitted using the second configured grant configuration, the first configured grant configuration is configured with repetition and the second configured grant configuration is configured with repetition, applying the repetition to receive the pending TB in the second configured grant configuration.

In embodiments of the present disclosure, in the second configured grant configuration, the pending TB may be received based on one of a configured repetition number in the second configured grant configuration; or a repetition number calculated by the configured repetition number in the second configured grant configuration minus a repetition number that the pending TB has been transmitted in the first configured grant configuration.

In embodiments of the present disclosure, the method may further comprise, when the pending TB has been transmitted using the first configured grant configuration, the pending TB is to be transmitted using the second configured grant configuration, the first configured grant configuration is configured with repetition and the second configured grant configuration is configured without repetition, disabling the repetition to receive the pending TB in the second configured grant configuration.

In embodiments of the present disclosure, the pending TB may be received using the first configured grant configuration associated with the first numerology when the first configured grant configuration is a first type of configured grant configuration.

In embodiments of the present disclosure, the pending TB may be received after the change from the first numerology to the second numerology has completed.

In embodiments of the present disclosure, the method may further comprise receiving a notification regarding the pending TB.

In embodiments of the present disclosure, the notification regarding the pending TB may be received via at least one of: a random access channel, RACH, message; a physical uplink control channel, PUCCH, transmission; a physical uplink shared channel, PUSCH, based transmission; or a sounding reference signal, SRS, transmission.

In embodiments of the present disclosure, the method may further comprise receiving capability information of the terminal device. The capability information may comprise a capability bit indicating whether the terminal device supports to transmit the pending TB using the second configured grant configuration associated with the second numerology.

A third aspect of the present disclosure provides a terminal device. The terminal device comprises a processor; and a memory, the memory containing instructions executable by the processor, whereby the terminal device is operative to determine a change from a first numerology to a second numerology. The terminal device is further operative to transmit a pending transmission block, TB, using a first configured grant configuration associated with the first numerology, or using a second configured grant configuration associated with the second numerology.

A fourth aspect of the present disclosure provides a network node. The network node comprises a processor; and a memory, the memory containing instructions executable by the processor, whereby the network node is operative to receive a pending transmission block, TB, from a terminal device. The pending TB is transmitted using a first configured grant configuration associated with a first numerology, or using a second configured grant configuration associated with a second numerology.

A fifth aspect of the present disclosure provides a terminal device. The terminal device comprises a determining module and a first transmitting module. The determining module may be configured to determine a change from a first numerology to a second numerology. The first transmitting module may be configured to transmit a pending transmission block, TB, using a first configured grant configuration associated with the first numerology, or using a second configured grant configuration associated with the second numerology.

In embodiments of the present disclosure, the terminal device may further comprise a receiving module configured to receive a message indicating the change from the first numerology to the second numerology.

In embodiments of the present disclosure, the terminal device may further comprise a performing module configured to perform rate matching to fit the second size when the first size is different from the second size.

In embodiments of the present disclosure, the terminal device may further comprise a clearing module configured to clear the first configured grant configuration after transmitting the pending TB using the second configured grant configuration associated with the second numerology.

In an embodiment, the terminal device may further comprise a first dropping module configured to drop the pending TB and a triggering module configured to trigger an upper layer retransmission.

In an embodiment, the terminal device may further comprise a copying module configured to copy the pending TB from the first HARQ process to the second HARQ process and a second dropping module configured to drop the pending TB in the first HARQ process.

In an embodiment, the terminal device may further comprise a third dropping module configured to, for the pending TB, stop a first timer and a second timer according to the first configured grant configuration which needs to be cleared, wherein the first timer is configured to indicate a maximum amount of time for the terminal device to transmit and retransmit a TB associated with a hybrid automatic repeat request, HARQ, process using a configured grant and the second timer is configured to indicate an autonomous retransmission time interval of configured grant for the HARQ process.

In an embodiment, the terminal device may further comprise a first restarting module configured to, for the pending TB, restart the first timer and the second timer according to the second configured grant configuration. The timer values of the first timer and the second timer according to the second configured grant configuration are set according to one of:

the timer values of the first timer and the second timer according to the second configured grant configuration are set as corresponding values configured in the second configured grant configuration; or the timer values of the first timer and the second timer according to the second configured grant configuration are set as the corresponding values configured in the second configured grant configuration minus corresponding elapsed time values of the first timer and the second timer according to the first configured grant configuration.

In an embodiment, the terminal device may further comprise a fourth dropping module configured to, for the pending TB, stop a first timer and a second timer according to the first configured grant configuration which needs to be suspended, wherein the first timer is configured to indicate a maximum amount of time for the terminal device to transmit and retransmit a TB associated with a hybrid automatic repeat request, HARQ, process using a configured grant and the second timer is configured to indicate an autonomous retransmission time interval of configured grant for the HARQ process.

In an embodiment, the terminal device may further comprise a second restarting module configured to, for the pending TB, restart the first timer and the second timer after the suspended first configured grant configuration is resumed. The respective timer values of the first timer and the second timer according to the first configured grant configuration are updated by excluding a suspension period of the first configured grant configuration associated with the first numerology In an embodiment, the terminal device may further comprise a first applying module configured to, when the pending TB has been transmitted using the first configured grant configuration, the pending TB is to be transmitted using the second configured grant configuration, the first configured grant configuration is configured without repetition and the second configured grant configuration is configured with repetition, apply the repetition to transmit the pending TB in the second configured grant configuration.

In an embodiment, the terminal device may further comprise a second applying module configured to, when the pending TB has been transmitted using the first configured grant configuration, the pending TB is to be transmitted using the second configured grant configuration, the first configured grant configuration is configured with repetition and the second configured grant configuration is configured with repetition, apply the repetition to transmit the pending TB in the second configured grant configuration.

In an embodiment, the terminal device may further comprise a third disabling module configured to, when the pending TB has been transmitted using the first configured grant configuration, the pending TB is to be transmitted using the second configured grant configuration, the first configured grant configuration is configured with repetition and the second configured grant configuration is configured without repetition, disable the repetition to transmit the pending TB in the second configured grant configuration.

In an embodiment, the terminal device may further comprise a second retransmitting module configured to retransmit the pending TB using the first configured grant configuration associated with the first numerology.

In an embodiment, the terminal device may further comprise a second transmitting module configured to transmit, to a network node, a notification regarding the pending TB.

In an embodiment, the terminal device may further comprise a third transmitting module configured to transmit capability information of the terminal device. The capability information comprises a capability bit indicating whether the terminal device supports to transmit the pending TB using the second configured grant configuration associated with the second numerology.

A sixth aspect of the present disclosure provides a network node. The network node comprises a first receiving module. The receiving module may be configured to receiving a pending transmission block, TB, from a terminal device. The pending TB is transmitted using a first configured grant configuration associated with a first numerology, or using a second configured grant configuration associated with a second numerology.

In an embodiment, the network node may further comprise a transmitting module configured to transmit a message indicating a change from the first numerology to the second numerology to the terminal device In an embodiment, the network node may further comprise a first applying module configured to, when the pending TB has been transmitted using the first configured grant configuration, the pending TB is to be transmitted using the second configured grant configuration, the first configured grant configuration is configured without repetition and the second configured grant configuration is configured with repetition, apply the repetition to receive the pending TB in the second configured grant configuration.

In an embodiment, the network node may further comprise a second applying module configured to, when the pending TB has been transmitted using the first configured grant configuration, the pending TB is to be transmitted using the second configured grant configuration, the first configured grant configuration is configured with repetition and the second configured grant configuration is configured with repetition, apply the repetition to receive the pending TB in the second configured grant configuration.

In an embodiment, the network node may further comprise a disabling module configured to, when the pending TB has been transmitted using the first configured grant configuration, the pending TB is to be transmitted using the second configured grant configuration, the first configured grant configuration is configured with repetition and the second configured grant configuration is configured without repetition, disable the repetition to receive the pending TB in the second configured grant configuration.

In an embodiment, the network node may further comprise a second receiving module configured to receive a notification regarding the pending TB.

In an embodiment, the network node may further comprise a third receiving module configured to receive capability information of the terminal device. The capability information comprises a capability bit indicating whether the terminal device supports to transmit the pending TB using the second configured grant configuration associated with the second numerology.

Another aspect of the present disclosure provides a computer-readable storage medium storing instructions which, when executed on at least one processor, cause the at least one processor to carry out any of the methods according to the first and second aspects of the disclosure.

Another aspect of the present disclosure provides a computer program product comprising instructions which, when executed on at least one processor, cause the at least one processor to carry out any of the methods according to the first and second aspects of the disclosure.

Another aspect of the present disclosure provides a communication system including a host computer including: processing circuitry configured to provide user data; and a communication interface configured to forward the user data to a cellular network for transmission to a terminal device. The cellular network includes a network node above mentioned, and/or the terminal device is above mentioned.

In embodiments of the present disclosure, the system further includes the terminal device, wherein the terminal device is configured to communicate with the network node.

In embodiments of the present disclosure, the processing circuitry of the host computer is configured to execute a host application, thereby providing the user data; and the terminal device includes processing circuitry configured to execute a client application associated with the host application.

Another aspect of the present disclosure provides a communication system including a host computer including: a communication interface configured to receive user data originating from a transmission from a terminal device; a network node. The transmission is from the terminal device to the network node. The network node is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Another aspect of the present disclosure provides a method implemented in a communication system which may include a host computer, a network node and a UE. The method may comprise providing user data at the host computer. Optionally, the method may comprise, at the host computer, initiating a transmission carrying the user data to the UE via a cellular network comprising the network node which may perform any step of the method according to the second aspect of the present disclosure.

Another aspect of the present disclosure provides a communication system including a host computer. The host computer may comprise processing circuitry configured to provide user data, and a communication interface configured to forward the user data to a cellular network for transmission to a UE. The cellular network may comprise a network node having a radio interface and processing circuitry. The network node's processing circuitry may be configured to perform any step of the method according to the second aspect of the present disclosure.

Another aspect of the present disclosure provides a method implemented in a communication system which may include a host computer, a network node and a UE. The method may comprise providing user data at the host computer. Optionally, the method may comprise, at the host computer, initiating a transmission carrying the user data to the UE via a cellular network comprising the network node. The UE may perform any step of the method according to the first aspect of the present disclosure.

Another aspect of the present disclosure provides a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

Another aspect of the present disclosure provides a method implemented in a communication system which may include a host computer, a network node and a UE. The method may comprise, at the host computer, receiving user data transmitted to the network node from the UE which may perform any step of the method according to the first aspect of the present disclosure.

Another aspect of the present disclosure provides a communication system including a host computer. The host computer may comprise a communication interface configured to receive user data originating from a transmission from a UE to a network node. The UE may comprise a radio interface and processing circuitry. The UE's processing circuitry may be configured to perform any step of the method according to the first aspect of the present disclosure.

Another aspect of the present disclosure provides a method implemented in a communication system which may include a host computer, a network node and a UE. The method may comprise, at the host computer, receiving, from the network node, user data originating from a transmission which the network node has received from the UE. The network node may perform any step of the method according to the second aspect of the present disclosure.

Another aspect of the present disclosure provides a communication system which may include a host computer. The host computer may comprise a communication interface configured to receive user data originating from a transmission from a UE to a network node. The network node may comprise a radio interface and processing circuitry. The network node's processing circuitry may be configured to perform any step of the method according to the second aspect of the present disclosure.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 5 shows a flowchart of a method according to another embodiment of the present disclosure;

FIG. 6 shows a flowchart of a method according to another embodiment of the present disclosure;

FIG. 7a shows a flowchart of a method according to another embodiment of the present disclosure;

FIG. 7b shows a flowchart of a method according to another embodiment of the present disclosure;

FIG. 7c shows a flowchart of a method according to another embodiment of the present disclosure;

FIG. 8b shows a flowchart of a method according to another embodiment of the present disclosure;

DETAILED DESCRIPTION

Figure 1A:
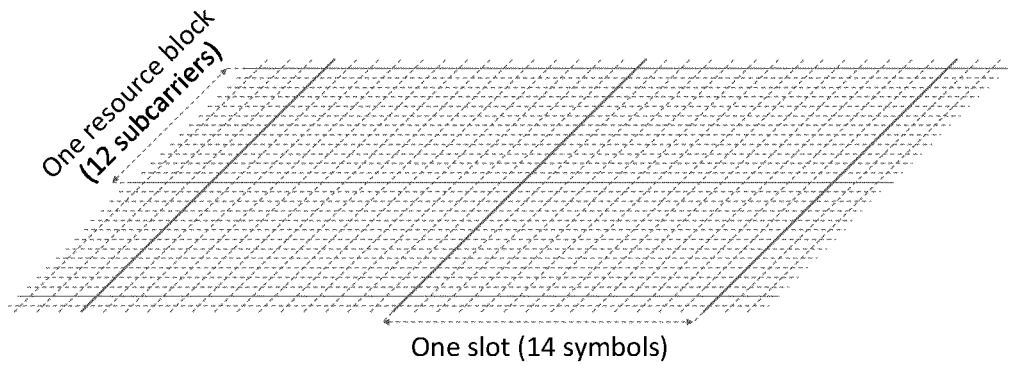
FIG. 1a schematically shows a basic NR physical resource over an antenna port.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols. For example, the wireless communication protocols may comprise the first generation (1G), 2G, 3G, 4G, 4.5G, 5G communication protocols, and/or any other protocols either currently known or to be developed in the future.

The term "network node" or "network side node" refers to a network device with accessing function in a communication network via which a terminal device accesses to the network and receives services therefrom. The network node may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), an Integrated Access and Backhaul (IAB) node, a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL, transmission refers to a transmission from a network device to a terminal device, and an uplink, UL, transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to the cellular network as defined by 3GPP being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies such as wireless sensor network may equally be utilized as long as exemplary embodiments described herein are applicable.

Channel Access Procedure in NR Unlicensed Spectrum

Listen-before-talk (LBT) is designed for unlicensed spectrum co-existence with other radio access technologies, RATs. In this mechanism, a radio device applies a clear channel assessment (CCA) check (i.e. channel sensing) before any transmission. The transmitter involves energy detection (ED) over a time period compared to a certain threshold (ED threshold) in order to determine if a channel is idle. In case the channel is determined to be occupied, the transmitter performs a random back-off within a contention window before next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For QoS (Quality of Service) differentiation, a channel access priority based on the service type has been defined. For example, there are four LBT priority classes are defined for differentiation of contention window sizes (CWS) and MCOT between services.

Prior to any transmission in the uplink, the UE may need to perform the LBT operation to grasp the channel. For instance, the Medium Access Control (MAC) layer initiates a transmission, the MAC layer requests the physical (PHY) layer to initiate the LBT operation, the PHY layer further sends an indicator to the MAC indicating the LBT outcome (i.e., success or failure).

NR Operation in Mm-Wave Bands

Mobile broadband will continue to drive the demands for higher overall traffic capacity and higher achievable end-user data rates in the wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 m in outdoor deployments, i.e. with an infra-structure density considerably higher than the densest networks of today. The wide transmission bandwidths needed to provide data rates up to 10 Gbps and above can likely only be obtained from spectrum allocations in the millimeter-wave band. High-gain beamforming, typically realized with array antennas, can be used to mitigate the increased pathloss at higher frequencies. Such networks may be referred to as NR systems.

NR supports a diverse set of use cases and a diverse set of deployment scenarios. The later includes deployment at both low frequencies (hundreds of MHz), and very high frequencies (mm waves in the tens of GHz). Two operation frequency ranges have been defined in NR: FR1 from 410 MHz to 7125 MHz and FR2 from 24.250 GHz to 52.6 GHz. The NR may support operation from 52.6 GHz to 71 GHz.

It is clarified that potential interference impact, if identified, may require interference mitigation solutions as part of channel access mechanism.

NR Frame Structure

Similar to LTE, NR uses OFDM (Orthogonal Frequency Division Multiplexing) in the downlink (i.e. from a network node, gNB, eNB, or base station, to a user equipment or UE). FIG. 1a schematically shows a basic NR physical resource over an antenna port that can be seen as a time-frequency grid, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times 2^{\wedge}\mu)$ kHz where $\mu \in (0, 1, 2, 3, 4)$. $\Delta f=15$ kHz is the basic (or reference) subcarrier spacing that is also used in LTE.

In the time domain, downlink and uplink transmissions in NR may be organized into equally-sized subframes of 1 ms each similar to LTE. A subframe is further divided into multiple slots of equal duration. The slot length for subcarrier spacing $\Delta f=(15\times 2^{\wedge}\mu)$ kHz is $\frac{1}{2}^{\wedge}\mu$ ms. There is only one slot per subframe for $\Delta f=15$ kHz and a slot consists of 14 OFDM symbols.

Downlink transmissions are dynamically scheduled, i.e., in each slot the gNB transmits downlink control information (DCI) about which UE data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A UE first detects and decodes PDCCH and if a PDCCH is decoded successfully, it then decodes the corresponding PDSCH based on the downlink assignment provided by decoded control information in the PDCCH.

In addition to PDCCH and PDSCH, there are also other channels and reference signals transmitted in the downlink, including Synchronization Signal Block (SSB), Channel State Information Reference Signal (CSI-RS), etc.

Uplink data transmissions, carried on Physical Uplink Shared Channel (PUSCH), can also be dynamically scheduled by the gNB by transmitting a DCI. The DCI (which is transmitted in the DL region) always indicates a scheduling time offset so that the PUSCH is transmitted in a slot in the UL region.

NR SCS (Sub-Carrier Spacing) Change

The evolving 5G standard NR (New Radio) is aiming to operate in a wide range of frequencies from below 1 GHz up to 100 GHz. In such a frequency range, the random access procedure in NR may be improved to mitigate the potential propagation losses at high frequency carriers.

For NR, it may use Band Width Parts (BWPs). The reasons for using BWPs are that some UEs might not be able to use the entire BW, in which case they are assigned a smaller BWP which they are capable of handling. Another reason is for reducing power consumption. A UE may be assigned a narrower BWP to reduce the needed energy for reception and transmission. Yet another reason could be for load balancing when the UEs do not need the entire BW to meet the bit rate requirements.

There may be some impacts of different sub-carrier spacings (SCSs). For example, there may be wider SCSs, namely 960 kHz, 1820 kHz and 3840 kHz. It is known that, with higher SCS, the radio channel conditions often deteriorate, implying that the UE coverage will be affected negatively, compared to low SCSs. Therefore, the benefits of increased bitrates offered by high SCS, may not always be available.

SCS may be configured by RRC and can be the same or different for UL and DL. Also, within the same carrier, the SCS may be different between different BWPs. Also, on different carriers, the SCS can be different. For BWPs, it can be envisioned that different BWPs may be configured with different SCS. For example, a low SCS on the initial BWP and higher SCSs on other BWPs to enable higher bit rates when coverage is sufficient.

A UE is assigned with at least an initial BWP (same for all UEs, narrow enough for all UEs to handle) and a default BWP. The default BWP may be the same as the initial BWP but may also be different (i.e. different UEs will typically have different default BWPs). In addition to initial and default BWP, the UE can be configured with additional BWPs. For example, a UE can have up to four DL/UL BWPs. At any point in time, only one BWP may be active for a specific UE.

The UE may be configured with BWPs using RRC signaling (except the initial which may be a part of system information (SI)) and switching between BWPs may be done by DCI on the PDCCH where a Bandwidth part indicator field can indicate a different BWP than the active BWP. There is also a possibility to switch to the default BWP when a BWP inactivity timer (e.g., bwp-InactivityTimer) expires or when Random Access is initiated.

Since the SCS may impact the coverage, it can sometimes be beneficial to change SCS. As described above, this may imply that either the BWP or the carrier is changed (or reconfigured).

BWP Switch Operation

As described in clause 5.15 of the 3GPP TS 38.321 V16.0.0, the disclosure of which is incorporated by reference herein in its entirety, a Serving Cell may be configured with one or multiple BWPs, and the maximum number of BWP per Serving Cell may be 4.

The BWP switching for a Serving Cell is used to activate an inactive BWP and deactivate an active BWP at a time. The BWP switching is controlled by the PDCCH indicating a downlink assignment or an uplink grant, or by the bwp-InactivityTimer, or by RRC signalling, or by the MAC entity itself upon initiation of Random Access procedure or upon detection of consistent LBT failure on SpCell (Special Cell). Upon RRC (re-)configuration of firstActiveDownlinkBWP-Id and/or firstActiveUplinkBWP-Id for SpCell or activation of an SCell (Secondary Cell), the DL BWP and/or UL BWP indicated by firstActiveDownlinkBWP-Id and/or firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL.

Entering or leaving dormant BWP is done by BWP switching. It is controlled per SCell or per dormancy SCell group by the PDCCH. The dormancy SCell group configuration indicated by dormancySCellGroups and dormant BWP configuration for one SCell indicated by dormantDownlinkBWP-Id are configured by RRC signalling as described in 3GPP TS 38.331 V16.0.0, the disclosure of which is incorporated by reference herein in its entirety. Upon reception of the PDCCH indicating leaving dormant BWP from SpCell outside active time, the DL BWP indicated by firstOutsideActiveTimeBWP-Id (as specified in 3GPP TS 38.331 V16.0.0) is activated. Upon reception of the PDCCH indicating leaving dormant BWP from SpCell within active time, the DL BWP indicated by firstWithinActiveTimeBWP-Id (as specified in 3GPP TS 38.331 V16.0.0) is activated. Upon reception of the PDCCH indicating entering dormant BWP, the DL BWP indicated by dormantDownlinkBWP-Id (as specified in 3GPP TS 38.331 V16.0.0) is activated. The dormant BWP configuration for SpCell or PUCCH SCell is not supported.

For each activated Serving Cell configured with a BWP, the MAC entity shall:

1> if a BWP is activated and it is not the dormant BWP:
   2> transmit on UL-SCH on the BWP;

2> transmit on RACH on the BWP, if PRACH occasions are configured;
2> monitor the PDCCH on the BWP;
2> transmit PUCCH on the BWP, if configured;
2> report CSI for the BWP;
2> transmit SRS on the BWP, if configured;
2> receive DL-SCH on the BWP;
2> (re-)initialize any suspended configured uplink grants of configured grant Type 1 on the active BWP according to the stored configuration, if any, and to start in the symbol according to rules in clause 5.8.2 in 3GPP TS 38.321 V16.0.0;
2> if consistent LBT failure recovery is configured:
3> stop the lbt-FailureDetectionTimer, if running;
3> set LBT_COUNTER to 0;
3> monitor LBT failure indications from lower layers as specified in clause 5.21.2 in 3GPP TS 38.321 V16.0.0.
1> if a BWP is activated and it is dormant BWP for an SCell:
2> stop the bwp-InactivityTimer of this Serving Cell, if running.
2> not monitor the PDCCH on the BWP;
2> not monitor the PDCCH for the BWP;
2> not receive DL-SCH on the BWP;
2> perform CSI measurement for the BWP, if configured;
2> stop all the UL behavior, i.e. stop any UL transmission, suspend any configured uplink grant Type 1 associated with the SCell, clear any configured uplink grant of configured grant Type 2 associated with the SCell;
2> if configured, perform beam failure detection and beam failure recovery for the SCell if beam failure is detected.
1> if a BWP is deactivated:
2> not transmit on UL-SCH on the BWP;
2> not transmit on RACH on the BWP;
2> not monitor the PDCCH on the BWP;
2> not transmit PUCCH on the BWP;
2> not report CSI for the BWP;
2> not transmit SRS on the BWP;
2> not receive DL-SCH on the BWP;
2> clear any configured downlink assignment and configured uplink grant of configured grant Type 2 on the BWP;
2> suspend any configured uplink grant of configured grant Type 1 on the inactive BWP.

Upon initiation of the Random Access procedure on a Serving Cell, after the selection of carrier for performing Random Access procedure as specified in clause 5.1.1 in 3GPP TS 38.321 V16.0.0, the MAC entity shall for the selected carrier of this Serving Cell:
1> if PRACH occasions are not configured for the active UL BWP:
2> switch the active UL BWP to BWP indicated by initialUplinkBWP;
2> if the Serving Cell is an SpCell:
3> switch the active DL BWP to BWP indicated by initialDownlinkBWP.
1> else:
2> if the Serving Cell is an SpCell:
3> if the active DL BWP does not have the same bwp-Id as the active UL BWP:
4> switch the active DL BWP to the DL BWP with the same bwp-Id as the active UL BWP.

1> stop the bwp-InactivityTimer associated with the active DL BWP of this Serving Cell, if running.
1> if the Serving Cell is SCell:
2> stop the bwp-InactivityTimer associated with the active DL BWP of SpCell, if running.
1> perform the Random Access procedure on the active DL BWP of SpCell and active UL BWP of this Serving Cell.

If the MAC entity receives a PDCCH for BWP switching of a Serving Cell, the MAC entity shall:
1> if there is no ongoing Random Access procedure associated with this Serving Cell; or
1> if the ongoing Random Access procedure associated with this Serving Cell is successfully completed upon reception of this PDCCH addressed to C-RNTI (as specified in clauses 5.1.4, 5.1.4a, and 5.1.5 in 3GPP TS 38.321 V16.0.0):
2> cancel, if any, triggered consistent LBT failure for this Serving Cell;
2> perform BWP switching to a BWP indicated by the PDCCH.

If the MAC entity receives a PDCCH for BWP switching for a Serving Cell(s) or a dormancy SCell group(s) while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion (as specified in clauses 5.1.4, 5.1.4a, and 5.1.5 in 3GPP TS 38.321 V16.0.0) in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the Serving Cell.

Upon reception of RRC (re-)configuration for BWP switching for a Serving Cell while a Random Access procedure associated with that Serving Cell is ongoing in the MAC entity, the MAC entity shall stop the ongoing Random Access procedure and initiate a Random Access procedure after performing the BWP switching.

Upon reception of RRC (re-)configuration for BWP switching for a Serving Cell, cancel any triggered LBT failure in this Serving Cell.

The MAC entity shall for each activated Serving Cell configured with bwp-InactivityTimer:
1> if the defaultDownlinkBWP-Id is configured, and the active DL BWP is not the BWP indicated by the defaultDownlinkBWP-Id, and the active DL BWP is not the BWP indicated by the dormantDownlinkBWP-Id if configured; or
1> if the defaultDownlinkBWP-Id is not configured, and the active DL BWP is not the initialDownlinkBWP, and the active DL BWP is not the BWP indicated by the dormantDownlinkBWP-Id if configured:
2> if a PDCCH addressed to C-RNTI or CS-RNTI indicating downlink assignment or uplink grant is received on the active BWP; or
2> if a PDCCH addressed to C-RNTI or CS-RNTI indicating downlink assignment or uplink grant is received for the active BWP; or 2> if a MAC PDU is transmitted in a configured uplink grant or received in a configured downlink assignment:
  3> if there is no ongoing Random Access procedure associated with this Serving Cell; or
  3> if the ongoing Random Access procedure associated with this Serving Cell is successfully completed upon reception of this PDCCH addressed to C-RNTI (as specified in clauses 5.1.4, 5.1.4a and 5.1.5 in 3GPP TS 38.321 V16.0.0.):
    4> start or restart the bwp-InactivityTimer associated with the active DL BWP.
2> if the bwp-InactivityTimer associated with the active DL BWP expires:
  3> if the defaultDownlinkBWP-Id is configured:
    4> perform BWP switching to a BWP indicated by the defaultDownlinkBWP-Id.
  3> else:
    4> perform BWP switching to the initialDownlinkBWP.
NOTE: If a Random Access procedure is initiated on an SCell, both this SCell and the SpCell are associated with this Random Access procedure.
1> if a PDCCH for BWP switching is received, and the MAC entity switches the active DL BWP:
  2> if the defaultDownlinkBWP-Id is configured, and the MAC entity switches to the DL BWP which is not indicated by the defaultDownlinkBWP-Id and is not indicated by the dormantDownlinkBWP-Id if configured; or
  2> if the defaultDownlinkBWP-Id is not configured, and the MAC entity switches to the DL BWP which is not the initialDownlinkBWP and is not indicated by the dormantDownlinkBWP-Id if configured:
    3> start or restart the bwp-InactivityTimer associated with the active DL BWP.

Configured Scheduling

In NR, configured scheduling is used to allocate semi-static periodic assignments or grants for a UE. For uplink, there are two types of configured scheduling schemes: Type 1 and Type 2. For Type 1, configured grants are configured via RRC signaling only. For Type 2, similar configuration procedure as SPS (Semi Persistent Scheduling in LTE) UL in LTE was defined, i.e. some parameters are preconfigured via RRC signaling and some physical layer parameters are configured via MAC scheduling procedure. The detail procedures can be found in 3GPP TS 38.321 V16.0.0 clause 5.8.2.

Like for SPS in LTE, the CG (configured grant) periodicity is RRC configured, and this is specified in the ConfiguredGrantConfig IE (information element). Different periodicity values are supported in NR depending on the subcarrier spacing. For example, for 15 and 30 kHz SCS, the following periodicities are supported, expressed in a number of OFDM symbols:

15 kHz SCS
  2, 7, and n*14 OFDM symbols
    where n∈{1, 2, 4, 5, 8, 10, 16, 20, 32, 40, 64, 80, 128, 160, 320, 640}
30 kHz SCS
  2, 7, and n*14 OFDM symbols
    where n∈{1, 2, 4, 5, 8, 10, 16, 20, 32, 40, 64, 80, 128, 160, 256, 320, 640, 1280}

For Type1 configured grants, in addition to the periodicity, the time domain allocation of PUSCH is configured purely via RRC signalling:

timeDomainOffset: Provides a slot offset with respect to SFN (System Frame Number) 0 timeDomainAllocation: Provides an index into a table of 16 possible combinations of PUSCH mapping type (TypeA or TypeB), start symbol S for the mapping (S=OFDM symbol 0, 2, 4, or 8 within a slot), and length L of the mapping (L=4, 6, 8, 10, 12, or 14 OFDM symbols).

For the case of Type2 configured grants, the periodicity is configured by RRC in the same way as for Type1, but the slot offset is dynamically indicated and is given by the slot in which the UE receives the DCI that activates the Type2 configured grant. In contrast to Type1, the time domain allocation of PUSCH is indicated dynamically by DCI via the time domain resource assignment field in the same way as for scheduled (non-CG) PUSCH. This DCI field indexes a table of start symbol and length (SLIV) values. The detailed configuration details of the RRC specification (i.e., 3GPP TS 38.331 V16.0.0) for configured grant is illustrated as table 1.

TABLE 1

Rel-16 ConfiguredGrantConfig IE in the RRC specification.

```
-- ASN1START
-- TAG-CONFIGUREDGRANTCONFIG-START
ConfiguredGrantConfig ::=           SEQUENCE {
    frequencyHopping                ENUMERATED {intraSlot, interSlot}                    OPTIONAL,    -- Need S
    cg-DMRS-Configuration           DMRS-UplinkConfig,
    mcs-Table                       ENUMERATED {qam256, qam64LowSE}                      OPTIONAL,    -- Need S
    mcs-TableTransformPrecoder      ENUMERATED {qam256, qam64LowSE}                      OPTIONAL,    -- Need S
    uci-OnPUSCH                     SetupRelease { CG-UCI-OnPUSCH }                      OPTIONAL,    -- Need M
    resourceAllocation              ENUMERATED { resourceAllocationType0, resourceAllocationType1,
dynamicSwitch },
    rbg-Size                        ENUMERATED {config2}                                 OPTIONAL,    -- Need S
    powerControlLoopToUse           ENUMERATED {n0, n1},
    p0-PUSCH-Alpha                  P0-PUSCH-AlphaSetId,
    transformPrecoder               ENUMERATED {enabled, disabled}                       OPTIONAL,    -- Need S
    nrofHARQ-Processes              INTEGER (1..16),
    repK                            ENUMERATED {n1, n2, n4, n8},
    repK-RV                         ENUMERATED {s1-0231, s2-0303, s3-0000}               OPTIONAL,    -- Need R
    periodicity                     ENUMERATED {
                                      sym2, sym7, sym1x14, sym2x14, sym4x14, sym5x14, sym8x14, sym10x14,
sym16x14, sym20x14, sym32x14, sym40x14, sym64x14, sym80x14, sym128x14, sym160x14, sym256x14, sym320x14,
sym512x14, sym640x14, sym1024x14, sym1280x14, sym2560x14, sym5120x14, sym6, sym1x12, sym2x12, sym4x12, sym5x12,
sym8x12, sym10x12, sym16x12, sym20x12, sym32x12,
sym40x12, sym64x12, sym80x12, sym128x12, sym160x12, sym256x12, sym320x12, sym512x12, sym640x12, sym1280x12,
```

TABLE 1-continued

Rel-16 ConfiguredGrantConfig IE in the RRC specification.

| | | | |
|---|---|---|---|
| sym2560x12 }, | | | |
|     configuredGrantTimer | INTEGER (1..64) | OPTIONAL, | -- Need R |
|     rrc-ConfiguredUplinkGrant | SEQUENCE { | | |
|         timeDomainOffset | INTEEGER (0..5119), | | |
|         timeDomainAllocation | INTEGER (0..15) | | |
|         frequencyDomainAllocation | BIT STRING (SIZE(18)), | | |
|         antennaPort | INTEGER (0..31), | | |
|         dmrs-SeqInitialization | INTEGER (0..1) | OPTIONAL, | -- Need R |
|         precodingAndNumberOfLayers | INTEGER (0..63), | | |
|         srs-ResourceIndicator | INTEGER (0..15) | OPTIONAL, | -- Need R |
|         mcsAndTBS | INTEGER (0..31), | | |
|         frequencyHoppingOffset | INTEGER (1..maxNrofPhysicalResourceBlocks-1) | OPTIONAL, | - Need R |
|         pathlossReferenceIndex | INTEGER (0..maxNrofPUCHS-PathlossReferenceRSs-1), | | |
|     ..., | | | |
|     [[ | | | |
|         pusch-RepTypeIndicator-r16 | ENUMERATED {pusch-RepTypeA,pusch-RepTypeB} | OPTIONAL, | -- Need M |
|         frequencyHoppingPUSCH-RepTypeB-r16 | ENUMERATED {interRepetition, interSlot} | OPTIONAL, | -- Cond RepTypeB |
|         timeReferenceSFN-r16 | ENUMERATED {sfn512} | OPTIONAL, | -- Need R |
|     ]] | | | |
|     } | | OPTIONAL, | -- Need R |
|     ..., | | | |
|     [[ | | | |
|         cg-RetransmissionTimer-r16 | INTEGER (1..64) | OPTIONAL, | -- Need R |
|         cg-minDFI-Delay-r16 | INTEGER (1..ffsvalue) | OPTIONAL, | -- Need R Upper limit 7 FFS |
|         cg-nrofPUSCH-InSlot-r16 | INTEGER (1..ffsvalue) | OPTIONAL, | -- Need R |
|         cg-nrofSlots-r16 | INTEGER (1..ffsvalue) | OPTIONAL, | -- Need R |
|         cg-StartingFullBW-InsideCOT-r16 | ENUMERATED {ffs} | OPTIONAL, | -- Need R |
|         cg-StartingFullBW-OutsideCOT-r16 | ENUMERATED {ffs} | OPTIONAL, | -- Need R |
|         cg-StartingFullBW-InsideCOT-r16 | ENUMERATED {ffs} | OPTIONAL, | -- Need R |
|         cg-StartingFullBW-OutsideCOT-r16 | ENUMERATED {ffs} | OPTIONAL, | -- Need R |
|         cg-UCI-Multiplexing | ENUMERATED {enabled} | OPTIONAL, | -- Need R |
|         cg-COT-SharingOffset-r16 | INTEGER (1..ffsValue) | OPTIONAL, | -- Need R |
|         betaOffsetCG-UCI-r16 | INTEGER (1..ffsValue) | OPTIONAL, | -- Need R |
|         cg-COT-SharingList-r16 | SEQUENCE (SIZE (1..ffsValue)) OF CG-COT-Sharing-r16 | OPTIONAL, | -- Need R |
|         harq-ProcID-Offset-r16 | INTEGER (0..15) | OPTIONAL, | -- Need M |
|         harq-ProcID-Offset2-r16 | INTEGER (0..15) | OPTIONAL, | -- Need M |
|         configuredGrantConfigIndex-r16 | ConfiguredGrantConfigIndex-r16 | OPTIONAL, | -- Need M |
|         configuredGrantConfigIndexMAC-r16 | ConfiguredGrantConfigIndexMAC-r16 | OPTIONAL, | -- Need M |
|         periodicityExt-r16 | INTEGER (1..5120) | OPTIONAL, | -- Need M |
|         startingFromV0-r16 | ENUMERATED {on, off} | OPTIONAL, | -- Need M |
|         phy-PriorityIndex-r16 | ENUMERATED {p0, p1} | OPTIONAL, | -- Need M |
|         autonomousReTx-r16 | ENUMERATED {enables} | OPTIONAL, | -- Cond LCH-BasedPrioritization |
|     ]] | | | |
| } | | | |

A UE can trigger a retransmission autonomously using a configured grant for a HARQ process configured with autonomous uplink (AUL) when the CG retransmission timer is expired while the UE has not received HARQ feedback for the HARQ process. A timer "CG retransmission timer (CGRT)" is defined accordingly. This timer is configured by the RRC parameter cg-RetransmissionTimer according to the ConfiguredGrantConfig. The CGRT is started for a HARQ process configured with AUL upon the data transmission using a configured grant, and a retransmission using another configured grant is triggered when the CGRT expires.

With this added functionality, it is beneficial for the UE to avoid the HARQ process to be stalled in case the gNB has missed the HARQ (hybrid automatic repeat request) transmission initiated by the UE. However, an issue is observed that a UE may just continuously initiate autonomous HARQ retransmissions for a HARQ process for a very long time. However, the gNB may not successfully receive the TB either due to bad radio channel quality or the channel is seldom obtained due to LBT failures. This is certainly not desirable because the packet may become too old and any retransmission attempt would just further congest the channel and further affect the latency of other packets in the UL buffer. The RLC (radio link control, RLC) layer at the UE may sooner or later trigger RLC retransmissions for a RLC PDU (protocol data unit) which is still under retransmissions in the HARQ. The retransmitted RLC PDU would occupy a different HARQ process. In this case, the UE would then maintain two HARQ processes in transmission for the same RLC PDU. The RLC receiver at the gNB may receive two RLC PDU duplicates. This may create a trouble in case a wraparound of the RLC sequence number occurs. The second received RLC PDU may be treated as a new data and forwarded upward instead the PDU should be dropped.

Therefore, it is necessary to introduce a maximum limit on AUL retransmissions of a HARQ process triggered by a UE. To address this issue, a timer is configured to indicate the maximum amount of time for the UE to complete transmission of an HARQ process, i.e. when the timer expires the UE should flush the HARQ buffer for this HARQ process and transmit new data associated to it. It has been agreed to use an existing timer configuredGrantTimer (CGT) for this purpose. If both CGT and CG retransmission timer (CGRT) are configured for a HARQ process, both timers can be operated in parallel. In this way, the UE can perform HARQ retransmission using CG resources for a HARQ process while CGT is running for the process. The value of CGT should be longer than that of CG retransmission timer. The HARQ buffer is flushed at expiry of CGT.

Figure 1B:
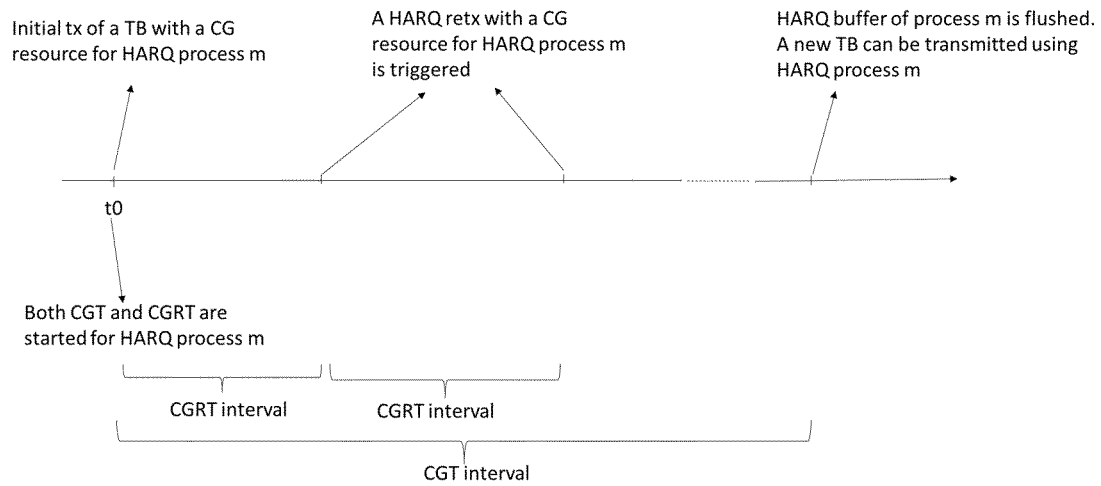
FIG. 1b shows an example of a procedure of controlling maximum number of AUL retransmissions using CGT.

FIG. 1b shows an example of a procedure of controlling maximum number of AUL retransmissions using CGT. As illustrated in FIG. 1b, at time t0, both CGT and CGRT are started for HARQ process m and an initial transmission (tx) of a TB with a CG resource for HARQ process m is started. When the network node such as gNB may not successfully receive the TB for example due to bad radio channel quality, a HARQ retransmission (retx) with a CG resource for HARQ process m is triggered in the subsequent one or more CGRT intervals. The HARQ buffer of process m is flushed at expiry of CGT and a new TB can be transmitted using the HARQ process m.

A UE can be provided with multiple active configured grants for a given BWP in a serving cell. The introduction of multiple configured grants would serve at least for enhancing reliability and reducing latency of critical services. In addition, it may apply multiple configured grants for allowing the UE to switch to slot-based transmissions after initiating the COT (channel occupancy time) to minimize DMRS (Demodulation Reference Signal) and UCI overhead in unlicensed spectrum.

For each CG configuration, there are a number of HARQ processes in the assigned HARQ process pool. There is also a separate CGT timer and CGRT setting associated with each CG configuration. It is allowed to share HARQ processes between CG configurations, which can give better configuration flexibility. In addition, if each CG configuration has separate associated HARQ process, the HARQ process space may become limited for the UE.

Since a logical channel (LCH) can be mapped to multiple CG configurations, meaning that the UE can transmit the data of the LCH using multiple active CG resources at the same time. For a TB which was transmitted using a CG resource, it is allowed to use any CG resource among the set of CG resources mapped to the LCH which comes earliest in the time to perform retransmission, this can reduce the latency. In addition, the selected resource shall provide same size as the same initial TB to avoid rate-matching on the TB. In addition, the UE shall stick to the same HARQ process for transmission/retransmission of a TB.

The CGT timer for a HARQ process shall be only started when the TB using this HARQ process is initially transmitted. The value of the CGT timer is set according to the CG configuration/resource which is used for the initial transmission. In parallel, the CGRT shall be started/restarted and set to the timer value which is used for every transmission/ retransmission attempt. If the initial transmission of a TB uses the resource in CG configuration 1, the CGRT is started using the timer value configured in CG configuration 1. The next retransmission of the TB is performed with the resource in CG configuration 2. The CGRT needs to be restarted and set to the timer value configured in CG configuration 2.

The HARQ process number field in the UL DCI (e.g., format 0-0 or format 0-1) scrambled by CS-RNTI (Configured Scheduling RNTI (Radio Network Temporary Identity)) is used to indicate which configuration is to be activated and which configuration(s) is/are to be released. In the DCI, NDI in the received HARQ information is 0.

Upon reception of an activation/reactivation/deactivation command, the UE provides a confirmation MAC CE (control element) to the gNB. The MAC CE contains a bitmap of CG configurations. In the bitmap field, each bit corresponds to a specific CG configuration (i.e., the bit position corresponds to the CG index).

Configured UL with Repetition

Repetition of a TB is also supported in NR, and the same resource configuration is used for K repetitions for a TB including the initial transmission. The higher layer configured parameters repK and repK-RV define the K repetitions to be applied to the transmitted transport block, and the redundancy version pattern to be applied to the repetitions. For the nth transmission occasion among K repetitions, n=1, 2, . . . , K, it is associated with (mod(n−1,4)+1)th value in the configured RV sequence. The initial transmission of a transport block may start at the first transmission occasion of the K repetitions if the configured RV sequence is {0,2,3,1}, any of the transmission occasions of the K repetitions that are associated with RV=0 if the configured RV sequence is {0,3,0,3}, any of the transmission occasions of the K repetitions if the configured RV sequence is {0,0,0,0}, except the last transmission occasion when K=8.

For any RV sequence, the repetitions shall be terminated after transmitting K repetitions, or at the last transmission occasion among the K repetitions within the period P, or when a UL grant for scheduling the same TB is received within the period P, whichever is reached first. The UE is not expected to be configured with the time duration for the transmission of K repetitions larger than the time duration derived by the periodicity P.

For both Type 1 and Type 2 PUSCH transmissions with a configured grant, when the UE is configured with repK>1, the UE shall repeat the TB across the repK consecutive slots applying the same symbol allocation in each slot. If the UE procedure for determining slot configuration, as defined in subclause 11.1 of 3GPP TS 38.213 V16.1.0, the disclosure of which is incorporated by reference herein in its entirety, determines symbols of a slot allocated for PUSCH as downlink symbols, the transmission on that slot is omitted for multi-slot PUSCH transmission An even higher SCS value range (e.g., between 480 kHz, 960 kHz, 1920 kHz and 3840 kHz) may be used in NR. The slot duration can be scaled in the below table accordingly if assuming 4097 FFT (Fast Fourier Transformation) will be applied.

Table 2 shows an example of numerologies for NR operation from 52.6 GHz to 71 GHz.

TABLE 2

| SCS [kHz] | 120 | 240 | 480 | 960 | 1920 | 3840 |
| --- | --- | --- | --- | --- | --- | --- |
| 275 PRBs allocation [GHz] | 0.40 | 0.79 | 1.58 | 3.17 | 6.34 | 12.67 |
| System BW [GHz] | 0.44 | 0.88 | 1.76 | 3.52 | 7.04 | 14.08 |

It is known that lower SCS allows longer CP and larger coverage. Vice versa, higher SCS give shorter CP and worse coverage. Therefore, higher SCS together with wider system bandwidth, which is able to provide higher data rate, may be feasible for UEs with good coverage.

With both lower and higher SCS configured in the cell, the actual applied SCS may need to change from time to time depending on needs.

SCS change may be typically coupled to BWP switch. In a wide carrier, multiple BWPs can be configured, each BWP can be configured with the following three different parameters:

SCS

Symbol duration

Cyclic prefix (CP) length.

BWP switching may be controlled by the PDCCH indicating a downlink assignment or an uplink grant, by the bwp-InactivityTimer, by RRC signalling, or by the MAC entity itself upon initiation of Random Access procedure or upon detection of consistent LBT failure on SpCell.

In addition, for a UE configured with multiple serving cells, each serving cell may be configured with a different SCS. In such a case, SCS change is in the form of cell change/activation/deactivation.

In case SCS is changed for a UE. For example, a BWP is changed to the UE, UE may perform below actions to handle the configured grants.

clear any configured downlink assignment and configured uplink grant of configured grant Type 2 on the BWP;

suspend any configured uplink grant of configured grant Type 1 on the inactive BWP.

As a summary, UE clears any configured grant Type 2 and suspends any configured grant Type 1 in the deactivated BWP. Similarly, in case a UE deactivates an SCell in a CA scenario, in an deactivated SCell, the UE performs the same actions to clear configured grants.

For either of above cases, when UE receives a SCS switch (e.g., in the form of BWP deactivation, or SCell deactivation) command, the UE may still have some pending TBs occupying HARQ processes, which are not acknowledged yet. If UE directly clears configured grants in the old BWP. There is a risk that those pending TBs would be lost since HARQ buffers associated with configured grants would need to be cleared. Such issues may be less problematic when gNB is responsible for scheduling retransmissions for an initial TB using a configured grant. In most of the time, gNB is aware of whether the UE has pending TBs. The gNB can choose a good time to order the UE to perform SCS switch, for example, when the UE has no pending TBs.

However, when a UE configured with CGRT is allowed to trigger autonomous retransmissions for a HARQ process configured with a configured grant, the UE may not be able to transmit a TB due to consistent LBT failure, as a result, the gNB will not be aware of this pending TB. In case the UE receives a SCS switch command, there is higher risk for the UE that pending TB will be lost due to that the UE has to clear configured grants in the BWP or cell which needs to be deactivated. In addition, when supporting NR operation from 52.6 GHz to 71 GHz, it is expected that a UE may need to change SCS frequently. The above issues would become more problematic.

Therefore, it is necessary to solve at least one of the above issues and develop corresponding enhancements regarding UE triggered numerology switch, e.g. SCS switch.

Exemplary embodiments tackling at least one of the above issues will be described in the following.

Further exemplary embodiments include terminal devices (e.g., UEs, wireless devices, IoT devices, etc., or components thereof) and network nodes (e.g., base stations, gNBs, eNBs, etc., or components thereof) configured to perform operations corresponding to any of the exemplary methods described herein. Exemplary embodiments also include non-transitory, computer-readable media storing computer-executable instructions that, when executed by processing circuitry, configure such terminal devices or network nodes to perform operations corresponding to any of the exemplary methods described herein. Exemplary embodiments also include computer program products that include such executable instructions.

The embodiments that will be describe in the following may be applicable both to licensed and unlicensed operations (such as Licensed-Assisted Access (LAA), en-hanced LAA (eLAA), further enhanced LAA (feLAA), MuLteFire, and NR unlicensed operation (NR-U)). The term LBT may be interchangeably called clear channel assessment (CCA), shared spectrum access procedure etc. The carrier on which the LBT is applied may belong to a shared spectrum or an unlicensed band or band with contention based access etc. Below embodiments are not restricted by terms. Any similar term is equally applicable here.

Figure 2:
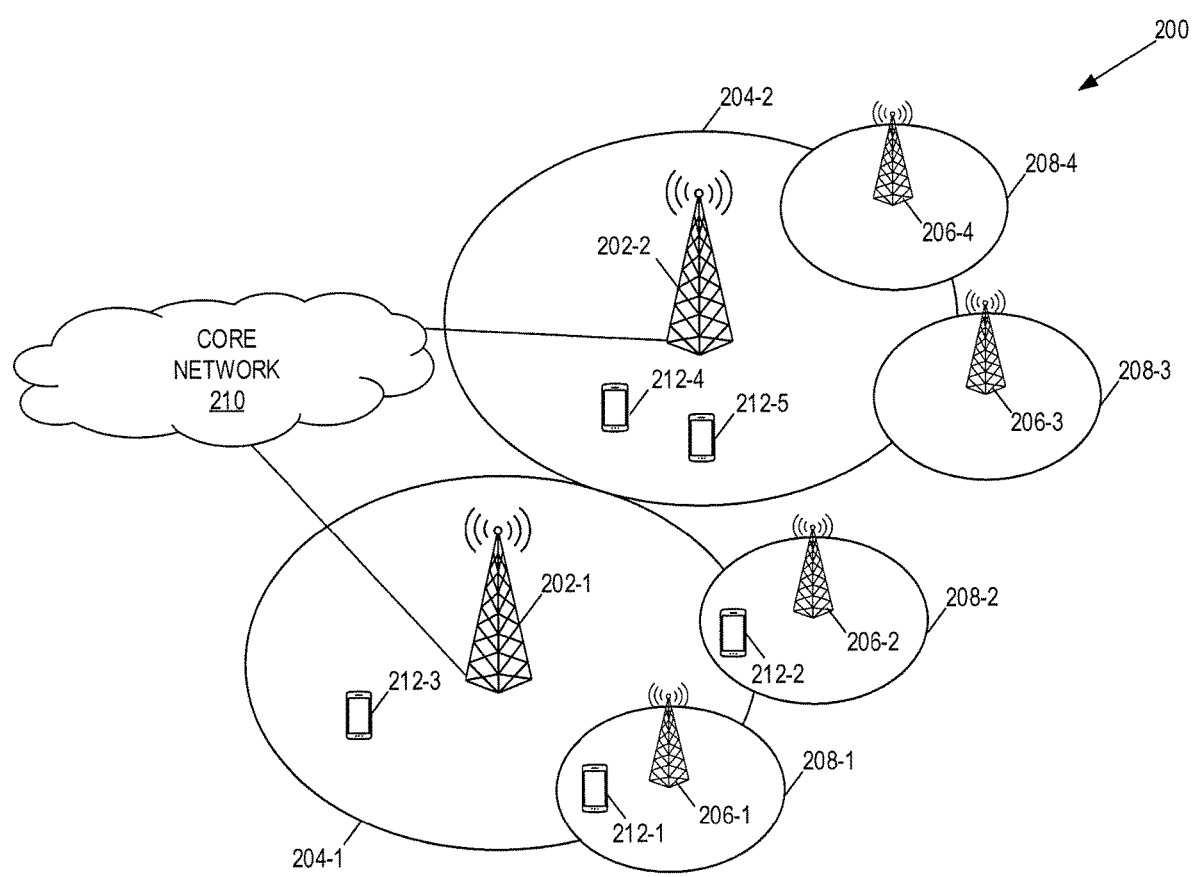
FIG. 2 depicts a schematic system, in which some embodiments of the present disclosure can be implemented.

FIG. 2 depicts a schematic system, in which some embodiments of the present disclosure can be implemented. In the embodiments described herein, the cellular communications system 200 may be a 5G System (5GS) including a Next Generation RAN (NG-RAN) and a 5G Core (5GC) or a LTE system including a RAN and an EPC. In this example, the RAN includes base stations 202-1 and 202-2, which in the 5GS include NR base stations (gNBs) and optionally next generation eNBs (ng-eNBs) (i.e., LTE RAN nodes connected to the 5GC), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G Core (5GC) and in the LTE is referred to as EPC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

Figure 3:
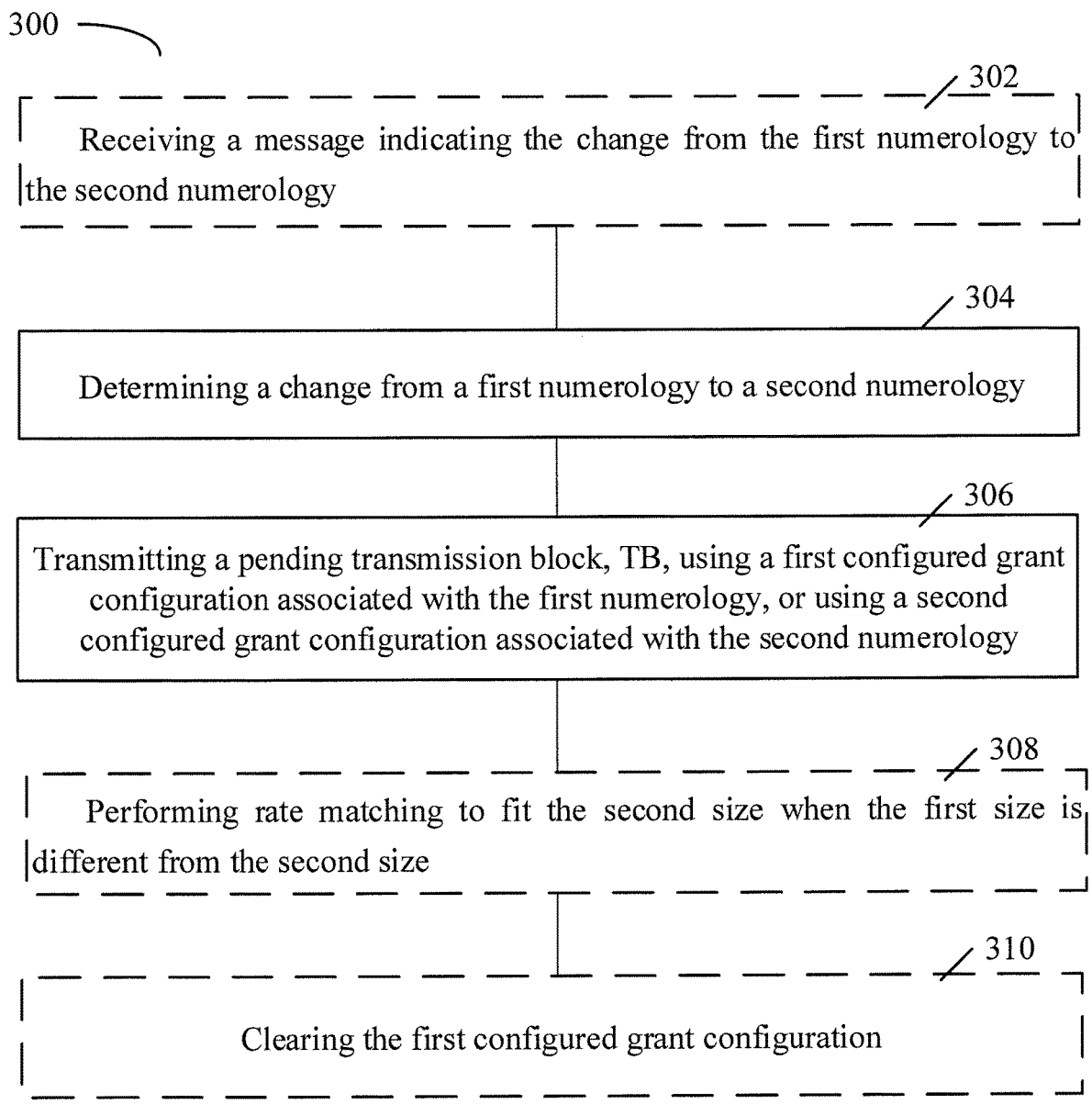
FIG. 3 shows a flowchart of a method according to an embodiment of the present disclosure.

FIG. 3 shows a flowchart of a method according to an embodiment of the present disclosure, which may be performed by an apparatus implemented in/as a terminal device or communicatively coupled to the terminal device. As such, the apparatus may provide means or modules for accomplishing various parts of the method 300 as well as means or modules for accomplishing other processes in conjunction with other components.

At block 302, optionally, the terminal device (or UE) may receive a message indicating a change from a first numerology to a second numerology. For example, the terminal device may receive this message from a network node such as gNB. The message may be any suitable message such as signaling message.

In an embodiment, the numerology may comprise at least one of:
- a sub-carrier spacing, SCS,
- a symbol duration, or
- a cyclic prefix, CP, length.

When the numerology is changed, at least one of the above parameters may be changed.

In an embodiment, each BWP can be configured with a specific numerology.

Since the SCS may impact the coverage, it can sometimes be beneficial to change SCS. As described above, SCS change may imply that either the BWP or the carrier is changed (or reconfigured). For example, the terminal device may be configured with BWPs using RRC signaling (except the initial BWP which may be part of system information (SI)). Switching between BWPs may be done by DCI on the PDCCH where a Bandwidth part indicator field can indicate a different BWP than the active BWP. There is also a possibility to switch to the default BWP when the bwp-InactivityTimer expires or when Random Access is initiated.

At block 304, the terminal device (or UE) may determine a change from the first numerology to the second numerology. The terminal device (or UE) may determine a change from the first numerology to the second numerology in various ways. For example, as described above, SCS change may imply that either the BWP or the carrier is changed (or reconfigured). When the terminal device determines to change from a first BWP to a second BWP or from a first carrier to a second carrier, the terminal device (or UE) may determine the change from the first numerology to the second numerology.

In an embodiment, the change from the first numerology to the second numerology is determined based on the message received at block 302 or consistent listen before talk, LBT, failure.

At block 306, the terminal device (or UE) may transmit a pending TB using a first configured grant configuration associated with the first numerology, or using a second configured grant configuration associated with the second numerology.

In an embodiment, the first configured grant configuration provides a first size for an initial TB. For example, at an initial transmission of the pending TB, the pending TB may be treated as the initial TB.

In an embodiment, the second configured grant configuration may provide a second size for the pending TB.

In an embodiment, the first size is the same as the second size. When the first size is the same as the second size, it can avoid rate-matching on the pending TB.

In an embodiment, the first size is different from the second size. In this case, the terminal device may need to perform rate matching to fit the second size.

In an embodiment, for the pending TB, in case there is no second configured grant configuration associated with the second numerology which can provide the same size as the initial TB, the terminal device may select any second configured grant configuration associated with the second numerology and move this pending TB to be associated with the selected second configured grant configuration.

In an embodiment, the initial TB is transmitted using the first configured grant configuration associated with the first numerology.

At block 308, optionally, the terminal device (or UE) may perform rate matching to fit the second size when the first size is different from the second size.

At block 310, optionally, the terminal device (or UE) may clear the first configured grant configuration after transmitting the pending TB using the second configured grant configuration associated with the second numerology.

In an embodiment, the second configured grant configuration is able to fulfil a quality of service, QoS, requirement of the pending TB.

In an embodiment, a hybrid automatic repeat request, HARQ, process associated with the pending TB is reused after changing from the first numerology to the second numerology.

In an embodiment, a hybrid automatic repeat request, HARQ, process associated with the pending TB is changed from a first HARQ process to a second HARQ process after changing from the first numerology to the second numerology.

Figure 4:
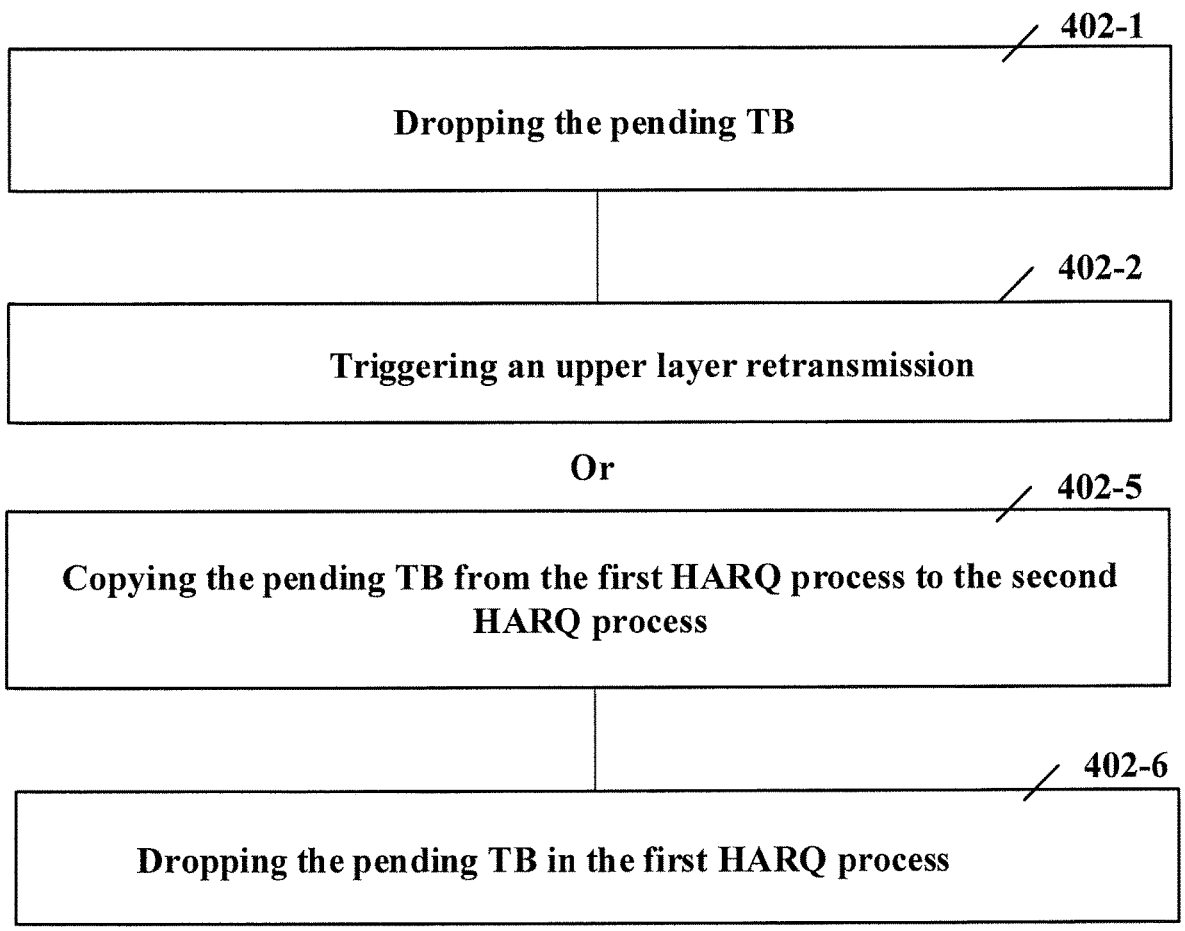
FIG. 4 shows a flowchart of a method according to another embodiment of the present disclosure.

As shown in FIG. 4, when the HARQ process associated with the pending TB is changed from the first HARQ process to the second HARQ process after changing from the first numerology to the second numerology, the terminal device (or UE) may drop the pending TB at block 402-1 and trigger an upper layer retransmission at block 402-2. Alternatively, the terminal device (or UE) may copy the pending TB from the first HARQ process to the second HARQ process at block 402-5 and drop the pending TB in the first HARQ process at block 402-6.

As shown in FIG. 5, for the pending TB, the terminal device (or UE) may stop a first timer and a second timer according to the first configured grant configuration which needs to be cleared at block 502. The first timer is configured to indicate a maximum amount of time for the terminal device to transmit and retransmit a TB associated with a hybrid automatic repeat request, HARQ, process using a configured grant and the second timer is configured to indicate an autonomous retransmission time interval of configured grant for the HARQ process. For the pending TB, the terminal device (or UE) may restart the first timer and the second timer according to the second configured grant configuration at block 504. In an embodiment, timer values of the first timer and the second timer according to the second configured grant configuration are set according to one of:
- the timer values of the first timer and the second timer according to the second configured grant configuration are set as corresponding values configured in the second configured grant configuration; or
- the timer values of the first timer and the second timer according to the second configured grant configuration are set as the corresponding values configured in the second configured grant configuration minus corresponding elapsed time values of the first timer and the second timer according to the first configured grant configuration.

As shown in FIG. 6, at block 602, for the pending TB, the terminal device (or UE) may stop a first timer and a second timer according to the first configured grant configuration which needs to be suspended. The first timer is configured to indicate a maximum amount of time for the terminal device to transmit and retransmit a TB associated with a hybrid automatic repeat request, HARQ, process using a configured grant and the second timer is configured to indicate an autonomous retransmission time interval of configured grant for the HARQ process. At block 604, for the pending TB, the terminal device (or UE) may restart the first timer and the second timer after the suspended first configured grant configuration is resumed. The respective timer values of the first timer and the second timer according to the first configured grant configuration may be updated by excluding a suspension period of the first configured grant configuration associated with the first numerology.

As shown in FIG. 7a, at block 702, when the pending TB has been transmitted using the first configured grant configuration, the pending TB is to be transmitted using the second configured grant configuration, the first configured grant configuration is configured without repetition and the second configured grant configuration is configured with repetition, the terminal device (or UE) may apply the repetition to transmit the pending TB in the second configured grant configuration.

In an embodiment, in the second configured grant configuration, the pending TB may be transmitted based on one of:

a configured repetition number in the second configured grant configuration;

a repetition number calculated by the configured repetition number in the second configured grant configuration minus one;

a repetition number configured by a network node; or a repetition number configured by the terminal device.

As shown in FIG. 7a, at block 704, when the pending TB has been transmitted using the first configured grant configuration, the pending TB is to be transmitted using the second configured grant configuration, the first configured grant configuration is configured with repetition and the second configured grant configuration is configured with repetition, the terminal device (or UE) may apply the repetition to transmit the pending TB in the second configured grant configuration.

In an embodiment, in the second configured grant configuration, the pending TB is transmitted based on one of:

a configured repetition number in the second configured grant configuration; or a repetition number calculated by the configured repetition number in the second configured grant configuration minus a repetition number that the pending TB has been transmitted in the first configured grant configuration.

As shown in FIG. 7a, at block 706, when the pending TB has been transmitted using the first configured grant configuration, the pending TB is to be transmitted using the second configured grant configuration, the first configured grant configuration is configured with repetition and the second configured grant configuration is configured without repetition, the terminal device (or UE) may disable the repetition to transmit the pending TB in the second configured grant configuration.

In an embodiment, the pending TB is transmitted using the first configured grant configuration associated with the first numerology when the first configured grant configuration is a first type of configured grant configuration.

In an embodiment, the first type of configured grant configuration comprises configured grant Type 1.

As shown in FIG. 7b, after the change from the first numerology to the second numerology has completed, the terminal device (or UE) may retransmit the pending TB using the first configured grant configuration associated with the first numerology at block 714.

As shown in FIG. 7c, at block 722, the terminal device (or UE) may transmit, to a network node, a notification regarding the pending TB. The network node may be base station such as gNB.

In an embodiment, the notification regarding the pending TB comprises at least one of:

a size of the pending TB;

information regarding a hybrid automatic repeat request, HARQ, process associated with the pending TB in the first configured grant configuration which was cleared;

information regarding the HARQ process associated with the pending TB in the first configured grant configuration which was suspended;

information regarding the second configured grant configuration, wherein the pending TB is to be transmitted using the second configured grant configuration; or information regarding the HARQ process to be used for retransmission of the pending TB after the change from the first numerology to the second numerology.

In an embodiment, the notification regarding the pending TB is transmitted to the network node via at least one of:

a random access channel, RACH, message.

a physical uplink control channel, PUCCH, transmission.

a physical uplink shared channel, PUSCH, based transmission.

a sounding reference signal, SRS, transmission.

In embodiments of the present disclosure, the terminal device may be configured with multiple configured grant configurations, and at least one of the configured grant configuration may be associated with at least one numerology.

In embodiments of the present disclosure, an association between a configured grant configuration and a numerology may be configured explicitly or inexplicitly.

In embodiments of the present disclosure, an index of a numerology may be included in a configured grant configuration.

In embodiments of the present disclosure, one or more configured grant configurations may be configured for a bandwidth part, BWP, and the BWP is configured with at least one numerology.

In embodiments of the present disclosure, one or more configured grant configurations are configured for a cell and the cell may be configured with at least one numerology.

In embodiments of the present disclosure, a BWP segment may be configured with at least one numerology.

As shown in FIG. 7c, at block 724, the terminal device (or UE) may transmitting capability information of the terminal device.

In an embodiment, the capability information comprises a capability bit indicating whether the terminal device supports to transmit the pending TB using the second configured grant configuration associated with the second numerology.

Figure 8A:
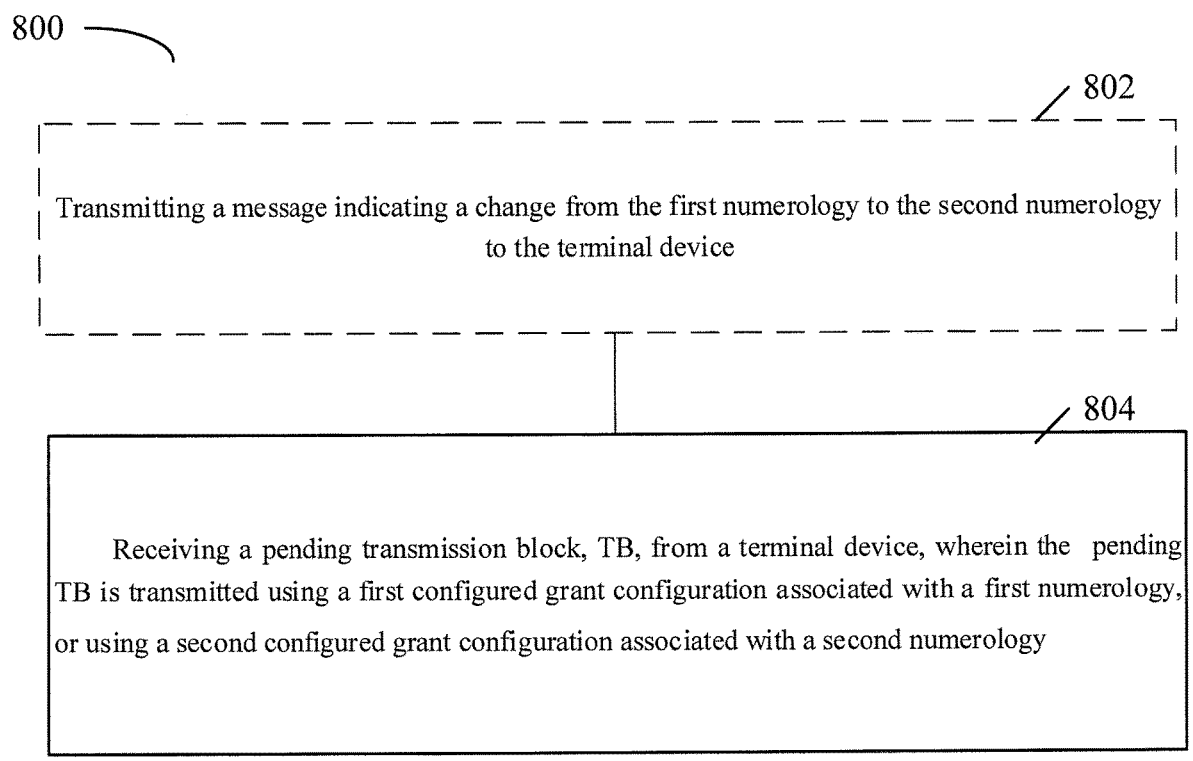
FIG. 8a shows a flowchart of a method according to another embodiment of the present disclosure.

FIG. 8a shows a flowchart of a method 800 according to another embodiment of the present disclosure, which may be performed by an apparatus implemented in/as a network node or communicatively coupled to the network node. As such, the apparatus may provide means or modules for accomplishing various parts of the method as well as means for accomplishing other processes in conjunction with other components. For some parts which have been described in the above embodiments, detailed description thereof is omitted here for brevity.

At block 802, optionally, the network node may transmit a message indicating a change from the first numerology to the second numerology to the terminal device.

At block 804, the network node may receive a pending transmission block, TB, from a terminal device. The pending TB is transmitted using a first configured grant configuration associated with a first numerology, or using a second configured grant configuration associated with a second numerology. For example, the terminal device may transmit the TB, using a first configured grant configuration associated with the first numerology, or using a second configured grant configuration associated with the second numerology at block 306 of FIG. 3, and then the network node may receive the TB, from the terminal device.

In an embodiment, a first timer is configured to indicate a maximum amount of time for the terminal device to transmit and retransmit a TB associated with a hybrid automatic repeat request, HARQ, process using a configured grant and a second timer is configured to indicate an autonomous retransmission time interval of configured grant for the HARQ process; and timer values of the first timer and the second timer according to the second configured grant configuration are set according to one of:
  the timer values of the first timer and the second timer according to the second configured grant configuration are set as corresponding values configured in the second configured grant configuration; or
  the timer values of the first timer and the second timer according to the second configured grant configuration are set as the corresponding values configured in the second configured grant configuration minus corresponding elapsed time values of the first timer and the second timer according to the first configured grant configuration.

In an embodiment, a first timer is configured to indicate a maximum amount of time for the terminal device to transmit and retransmit a TB associated with a hybrid automatic repeat request, HARQ, process using a configured grant and a second timer is configured to indicate an autonomous retransmission time interval of configured grant for the HARQ process, and respective timer values of the first timer and the second timer according to the first configured grant configuration are updated by excluding a suspension period of the first configured grant configuration associated with the first numerology.

As shown in FIG. 8b, at block 812, when the pending TB has been transmitted using the first configured grant configuration, the pending TB is to be transmitted using the second configured grant configuration, the first configured grant configuration is configured without repetition and the second configured grant configuration is configured with repetition, the network node may apply the repetition to receive the pending TB in the second configured grant configuration.

In an embodiment, in the second configured grant configuration, the pending TB is received based on one of:
  a configured repetition number in the second configured grant configuration;
  a repetition number calculated by the configured repetition number in the second configured grant configuration minus one;
  a repetition number configured by a network node; or
  a repetition number configured by the terminal device.

As shown in FIG. 8b, at block 814, when the pending TB has been transmitted using the first configured grant configuration, the pending TB is to be transmitted using the second configured grant configuration, the first configured grant configuration is configured with repetition and the second configured grant configuration is configured with repetition, the network node may apply the repetition to receive the pending TB in the second configured grant configuration.

In an embodiment, in the second configured grant configuration, the pending TB is received based on one of:
  a configured repetition number in the second configured grant configuration; or
  a repetition number calculated by the configured repetition number in the second configured grant configuration minus a repetition number that the pending TB has been transmitted in the first configured grant configuration.

As shown in FIG. 8b, at block 816, when the pending TB has been transmitted using the first configured grant configuration, the pending TB is to be transmitted using the second configured grant configuration, the first configured grant configuration is configured with repetition and the second configured grant configuration is configured without repetition, the network node may disable the repetition to receive the pending TB in the second configured grant configuration.

In an embodiment, the pending TB is received using the first configured grant configuration associated with the first numerology when the first configured grant configuration is a first type of configured grant configuration.

In an embodiment, the first type of configured grant configuration comprises configured grant Type 1 (or Type 1 configured grant).

In an embodiment, the pending TB is received after the change from the first numerology to the second numerology has completed.

Figure 8C:
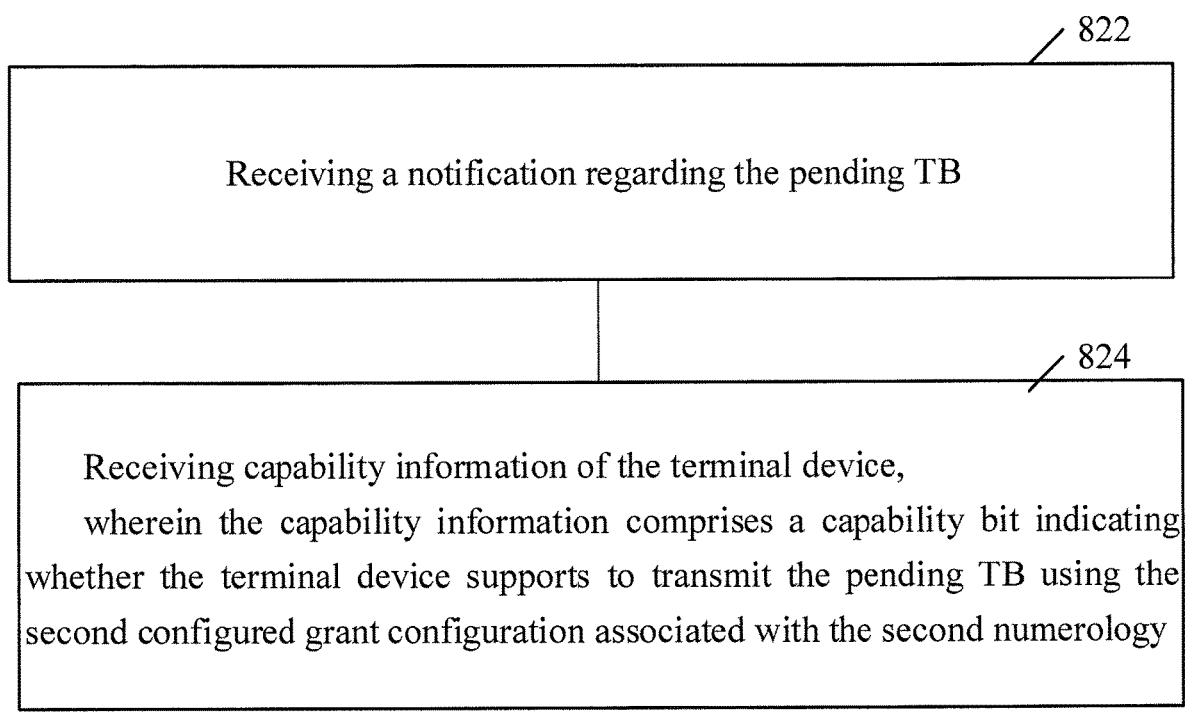
FIG. 8c shows a flowchart of a method according to another embodiment of the present disclosure.

As shown in FIG. 8c, at block 822, the network node may receive a notification regarding the pending TB.

In an embodiment, the notification regarding the pending TB comprises at least one of:
  a size of the pending TB;
  information regarding a hybrid automatic repeat request, HARQ, process associated with the pending TB in the first configured grant configuration which was cleared;
  information regarding the HARQ process associated with the pending TB in the first configured grant configuration which was suspended;
  information regarding the second configured grant configuration, wherein the pending TB is to be transmitted using the second configured grant configuration; or
  information regarding the HARQ process to be used for retransmission of the pending TB after the change from the first numerology to the second numerology.

In an embodiment, the notification regarding the pending TB is received via at least one of:
  a random access channel, RACH, message.
  a physical uplink control channel, PUCCH, transmission.
  a physical uplink shared channel, PUSCH, based transmission.
  a sounding reference signal, SRS, transmission.

As shown in FIG. 8c, at block 824, the network node may receive capability information of the terminal device. For example, the network node may receive the capability information of the terminal device from the terminal device.

In an embodiment, the capability information comprises a capability bit indicating whether the terminal device supports to transmit the pending TB using the second configured grant configuration associated with the second numerology.

In an embodiment, a UE is configured with multiple CG configurations, wherein each configuration may be mapped to a specific SCS. The mapping may be configured explicitly or inexplicitly. For example, for the former, an index of SCS may be added into the CG configuration. For the latter, there may be no direct mapping relation between CG configurations and SCS values. Instead, in one example, one or multiple CG configurations may be configured for a BWP, which may be configured with a different SCS. In another example, one or multiple CG configurations may be configured for a cell, which may be configured with a different SCS. In yet another example, a wide BWP may contain multiple bandwidth segments referred to as e.g., channel, sub-band, BWP segment, etc., for each segment, it may be configured with a different SCS. For each BWP segment, there may be at least one CG configuration configured.

In an embodiment, in case a serving SCS change is triggered for UE (either by receiving a command from the gNB or triggered by UE itself), if there are pending TBs which have been transmitted using CG resources which are mapped to this serving SCS, before clearing the CG resource which are mapped to this serving SCS, the UE may take at least one of below options to handle those pending TBs Option A: for every pending TB, select a CG configuration mapped to the new SCS which can provide the same size as the initial TB, and move this pending TB to be associated with the selected CG configuration. In other words, this pending TB is not dropped or lost when changing SCS, this pending TB will be retransmitted using the CG resources of the selected CG configuration on the next CG occasion.

Option B: for every pending TB, in case there is no CG configuration mapped to the new SCS which can provide the same size as the initial TB, select any CG configuration mapped to the new SCS, move this pending TB to be associated with the selected CG configuration. In other words, this pending TB is not dropped or lost when changing SCS, this pending TB will be retransmitted using the CG resources of the selected CG configuration on the next CG occasion.

Option C: for a pending TB, in case this pending TB was initially transmitted using a Type 1 CG resource, this pending TB can be remained to be mapped to this Type 1 CG configuration. While this Type 1 CG configuration is being suspended, this pending TB will not be retransmitted. After the SCS change has completed, UE will resume this Type 1 CG configuration, after that, this pending TB will be retransmitted using the CG resource provided by this Type 1 CG configuration on the next CG occasion.

In an embodiment, in case a serving SCS change is triggered for UE (either by receiving a command from the gNB or triggered by UE itself), if there are pending TBs which have been transmitted using CG resources which are mapped to this serving SCS, before clearing the CG resource which are mapped to this serving SCS, the UE may take the below steps to handle the CG timers for those pending TBs.

Step 1: for each pending TB, stop the CGT and the CGRT in the CG configuration which needs to be cleared or suspended.

Step 2: for each pending TB, restart the CGT and the CGRT in the new CG configuration which is moved to. The timer value is set according to either of below options Option x: the timer value is set as the value configured in the new CG configuration.

Option y: the timer value is set as the value configured in the new CG configuration minus the elapsed time period of the timer according to the old CG configuration (i.e., the one which needs to be cleared).

In a first embodiment, a UE is configured with multiple CG configurations, wherein each configuration may be mapped to a specific SCS. The mapping is configured explicitly or inexplicitly. For the former, an index of SCS may be added into the CG configuration. For the latter, there is no direct mapping relation between CG configurations and SCS values. Instead, in one example, one or multiple CG configurations may be configured for a BWP, which may be configured with a different SCS. In another example, one or multiple CG configurations may be configured for a cell, which may be configured with a different SCS. In yet another example, a wide BWP may contain multiple bandwidth segments referred to as e.g., channel, sub-band, BWP segment etc., for each segment, it may be configured with a different SCS. For each BWP segment, there may be at least one CG configuration configured.

In a second embodiment, in case a serving SCS change is triggered for UE (either by receiving a command from the gNB or triggered by UE itself), if there are pending TBs which have been transmitted using CG resources which are mapped to this serving SCS, before clearing the CG resource which are mapped to this serving SCS, the UE may take at least one of below options to handle those pending TBs Option 1: for every pending TB, select a CG configuration mapped to the new SCS which can provide the same size as the initial TB, and move this pending TB to be associated with the selected CG configuration. In other words, this pending TB is not dropped or lost when changing SCS, this pending TB will be retransmitted using the CG resources of the selected CG configuration on the next CG occasion.

Option 2: for every pending TB, in case there is no CG configuration mapped to the new SCS which can provide the same size as the initial TB, select any CG configuration mapped to the new SCS, move this pending TB to be associated with the selected CG configuration. In other words, this pending TB is not dropped or lost when changing SCS, this pending TB will be retransmitted using the CG resources of the selected CG configuration on the next CG occasion.

Option 3: for a pending TB, in case this pending TB was initially transmitted using a Type 1 CG resource, this pending TB can be remained to be mapped to this Type 1 CG configuration. While this Type 1 CG configuration is being suspended, this pending TB will not be retransmitted. After the SCS change has completed, UE will resume this Type 1 CG configuration, after that, this pending TB will be retransmitted using the CG resource provided by this Type 1 CG configuration on the next CG occasion.

For any above options 1-3, the selected resource in another CG configuration which is mapped to the new SCS shall be able to fulfill the expected QoS requirements of the pending TB. Each pending TB may be associated with different logical channels or services, which have specific QoS requirements. For a TB requiring short latency, the UE shall select a CG configuration which gives most frequent transmission opportunities or most fast transmission opportunities (e.g., the CG gives earliest transmission opportunities or shortest transmission opportunities).

For any above options 1-3, the selected resource in another CG configuration which is mapped to the new SCS shall provide the same size as the initial TB.

For any above options 1-3, the selected resource in another CG configuration which is mapped to the new SCS may provide a different size (smaller or bigger) than the initial TB. The UE need to perform rate matching to fit the new size.

For any above options 1-3, using the selected configured resource in another CG configuration which is mapped to the new SCS, the TB may be retransmitted using a same HARQ process. The UE may choose a configured resource in a CG configuration on which the same HARQ process ID is configured.

For any above options 1-3, using the selected configured resource in another CG configuration which is mapped to the new SCS, the TB may be retransmitted using a different HARQ process. In case the HARQ process is different for a retransmission, the UE may have two alternatives to handle the retransmission.

Alternative 1: the UE drops the current TB, and triggers upper layer retransmissions Alternative 2: the UE copies the TB from the first HARQ process to the second HARQ process. After that, the UE drops the TB in the first HARQ process.

For any above options 1-3, the UE may send a signal to the gNB and inform the gNB of the information on those pending TBs which have been affected by the recent SCS change. The information may contain at least one of the below information such as

- size and associated HARQ process of each pending TB in the CG configurations which was cleared
- size and associated HARQ process of each pending TB in the CG configurations which was suspended
- For each pending TB, which CG configuration the TB has been moved to.
- Which HARQ process is to be used for retransmission of the TB.

The signaling on pending TBs may be sent to the gNB by the UE via at least one of the below signaling options Option A: a RACH message.
Option B: a PUCCH transmission.
Option C: a PUSCH based transmission.
Option D: an SRS transmission.

For Option A and Option C, the information may be carried in a MAC CE or in an RRC signaling message.

Alternatively, some information may be carried in a UCI on PUCCH, or multiplexed in a PUSCH.

In the third embodiment, in case a serving SCS change is triggered for UE (either by receiving a command from the gNB or triggered by UE itself), if there are pending TBs which have been transmitted using CG resources which are mapped to this serving SCS, before clearing the CG resource which are mapped to this serving SCS, the UE may take the below steps to handle the CG timers for those pending TBs.

Step A: for each pending TB, stop the CGT and the CGRT in the CG configuration which needs to be cleared or suspended.

Step C: for each pending TB, restart the CGT and the CGRT in the new CG configuration which is moved to. The timer value is set according to either of below options Option e: the timer value is set as the value configured in the new CG configuration.

Option f: the timer value is set as the value configured in the new CG configuration minus the elapsed time period of the timer according to the old CG configuration (i.e., the one which needs to be cleared).

Alternatively, for those pending TBs associated with the suspended CG configurations, their timers will be restarted after the suspended CG configurations are resumed, the timer values are updated considering the suspension period, i.e., the suspension period is excluded.

In a fourth embodiment, in case a serving SCS change is triggered for UE (either by receiving a command from the gNB or triggered by UE itself), if there are pending TBs which have been transmitted using CG resources which are mapped to this serving SCS, before clearing the CG resource which are mapped to this serving SCS, the UE may take the below options to handle the CG repetitions for those pending TBs.

Option 14: a pending TB may be moved from a CG configuration without repetition to a new CG configuration with repetition. In this case, UE applies repetition to transmit the pending TB in the new CG configuration. In the new CG configuration, this pending TB may be treated as an initial TB when selecting RV value according to the configured repK-RV. Alternatively, this pending TB is not treated as an initial TB when selecting RV value according to the configured repK-RV in the new CG configuration. In an example, in the new CG configuration, the UE transmits only up to repK-1 repetitions for the pending TB. In another example, in the new CG configuration, how many repetitions are performed for the pending TB is up to the gNB configuration. In yet another example, in the new CG configuration, how many repetitions are performed for the pending TB is up to the UE implementation.

Option 15: a pending TB may be moved from a CG configuration with repetition to a new CG configuration without repetition. In this case, UE doesn't apply repetition to transmit the pending TB in the new CG configuration.

Option 16: a pending TB may be moved from a CG configuration with repetition (e.g., CG1) to a new CG configuration with repetition (e.g., CG2). In this case, UE continues to apply repetition to transmit the pending TB in the new CG configuration. In CG2, the UE may apply one of the below alternatives for selecting RV for a transmission of the pending TB.

Alternative X: this pending TB can be treated as an initial TB when selecting RV value according to the configured parameters repK and repK-RV in CG2. In other words, in CG2, up to repK repetitions for this pending TB can be performed (e.g., if there are repK occasions within the current periodicity of CG2). For the nth transmission occasion among repK repetitions, n=1, 2, . . . , repK, it is associated with $(\mod(n-1,4)+1)$th value in the configured RV sequence, i.e., repK-RV of CG2.

Alternative Y: selecting RV considers the number of repetitions which have been transmitted in CG1. For example, UE has already transmitted n1 (n1<repK of CG1) repetitions for the pending TB, the UE can transmit up to n2 repetition (i.e., n2=repK of CG2-n1). For the nth transmission occasion among repK repetitions, n=1, 2, . . . , n2, it is associated with $(\mod(n1+n-1,4)+1)$th value in the configured RV sequence, i.e., repK-RV of CG2.

In a fifth embodiment, a UE capability bit indicating whether the UE supports to move a pending TB from a CG configuration to another CG configuration.

In a sixth embodiment, for any above first to fifth embodiments, it is equally applicable for a UE in case OFDM Symbol duration or Cyclic prefix (CP) length changes.

Figure 9A:
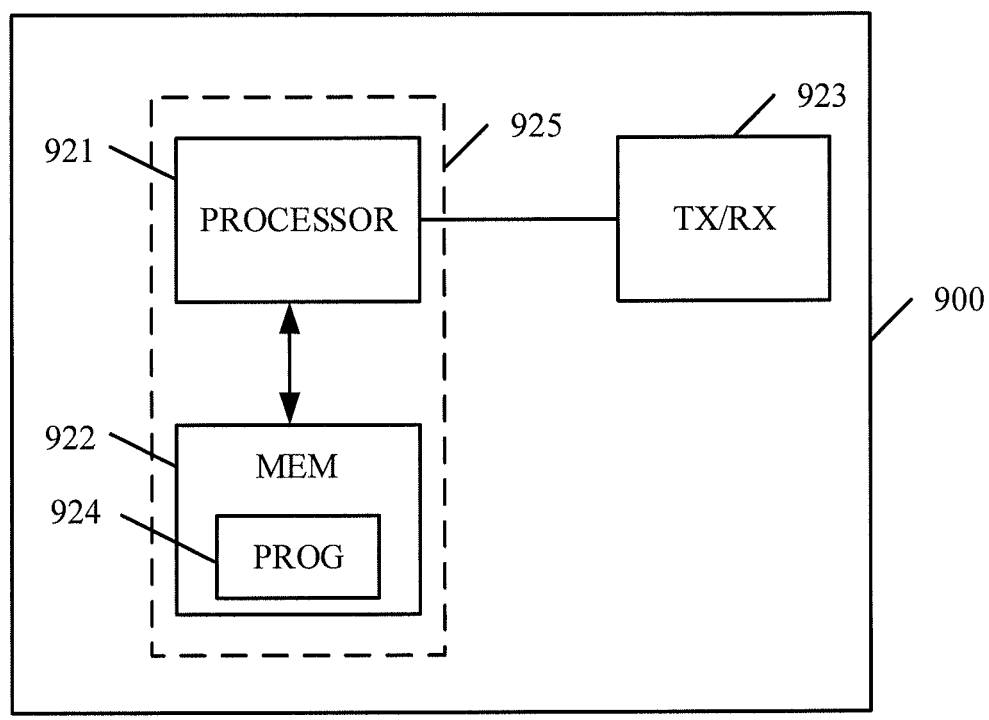
FIG. 9a is a block diagram showing an apparatus suitable for practicing some embodiments of the disclosure.

FIG. 9a is a block diagram showing an apparatus suitable for practicing some embodiments of the disclosure. For example, any one of the terminal device and the network node described above may be implemented as or through the apparatus 900.

The apparatus 900 comprises at least one processor 921, such as a digital processor (DP), and at least one memory (MEM) 922 coupled to the processor 921. The apparatus 920 may further comprise a transmitter TX and receiver RX 923 coupled to the processor 921. The MEM 922 stores a program (PROG) 924. The PROG 924 may include instructions that, when executed on the associated processor 921, enable the apparatus 920 to operate in accordance with the embodiments of the present disclosure. A combination of the at least one processor 921 and the at least one MEM 922 may form processing means 925 adapted to implement various embodiments of the present disclosure.

Various embodiments of the present disclosure may be implemented by computer program executable by one or more of the processor 921, software, firmware, hardware or in a combination thereof.

The MEM 922 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 921 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the terminal device, the memory 922 contains instructions executable by the processor 921, whereby the terminal device operates according to any step of any of the methods related to the terminal device as described above.

In an embodiment where the apparatus is implemented as or at the network node, the memory 922 contains instructions executable by the processor 921, whereby the network node operates according to any step of any of the methods related to the network node as described above.

Figure 9B:
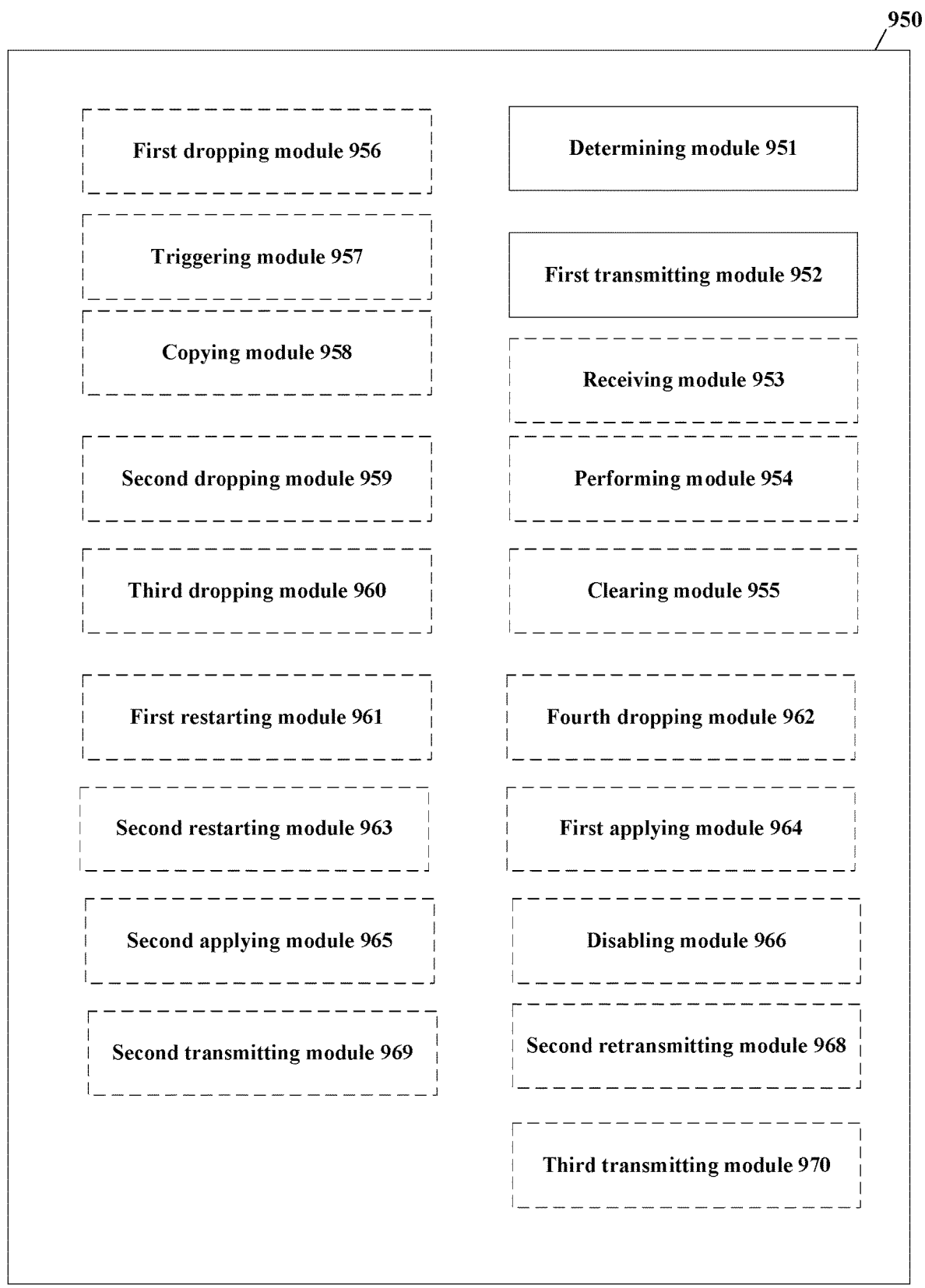
FIG. 9b is a block diagram showing a terminal device according to an embodiment of the disclosure.

FIG. 9b is a block diagram showing a terminal device according to an embodiment of the disclosure. As shown, the terminal device 950 comprises a determining module 951 and a first transmitting module 952. The determining module 951 may be configured to determine a change from a first numerology to a second numerology. The first transmitting module 952 may be configured to transmit a pending transmission block, TB, using a first configured grant configuration associated with the first numerology, or using a second configured grant configuration associated with the second numerology.

In embodiments of the present disclosure, the terminal device 950 may further comprise a receiving module 953 configured to receive a message indicating the change from the first numerology to the second numerology.

In embodiments of the present disclosure, the terminal device 950 may further comprise a performing module 954 configured to perform rate matching to fit the second size when the first size is different from the second size.

In embodiments of the present disclosure, the terminal device 950 may further comprise a clearing module 955 configured to clear the first configured grant configuration after transmitting the pending TB using the second configured grant configuration associated with the second numerology.

In an embodiment, the terminal device 950 may further comprise a first dropping module 956 configured to drop the pending TB and a triggering module 957 configured to trigger an upper layer retransmission.

In an embodiment, the terminal device 950 may further comprise a copying module 958 configured to copy the pending TB from the first HARQ process to the second HARQ process and a second dropping module 959 configured to drop the pending TB in the first HARQ process.

In an embodiment, the terminal device 950 may further comprise a third dropping module 960 configured to, for the pending TB, stop a first timer and a second timer according to the first configured grant configuration which needs to be cleared, wherein the first timer is configured to indicate a maximum amount of time for the terminal device to transmit and retransmit a TB associated with a hybrid automatic repeat request, HARQ, process using a configured grant and the second timer is configured to indicate an autonomous retransmission time interval of configured grant for the HARQ process.

In an embodiment, the terminal device 950 may further comprise a first restarting module 961 configured to, for the pending TB, restart the first timer and the second timer according to the second configured grant configuration. The timer values of the first timer and the second timer according to the second configured grant configuration are set according to one of:

the timer values of the first timer and the second timer according to the second configured grant configuration are set as corresponding values configured in the second configured grant configuration; or the timer values of the first timer and the second timer according to the second configured grant configuration are set as the corresponding values configured in the second configured grant configuration minus corresponding elapsed time values of the first timer and the second timer according to the first configured grant configuration.

In an embodiment, the terminal device 950 may further comprise a fourth dropping module 962 configured to, for the pending TB, stop a first timer and a second timer according to the first configured grant configuration which needs to be suspended, wherein the first timer is configured to indicate a maximum amount of time for the terminal device to transmit and retransmit a TB associated with a hybrid automatic repeat request, HARQ, process using a configured grant and the second timer is configured to indicate an autonomous retransmission time interval of configured grant for the HARQ process.

In an embodiment, the terminal device 950 may further comprise a second restarting module 963 configured to, for the pending TB, restart the first timer and the second timer after the suspended first configured grant configuration is resumed. The respective timer values of the first timer and the second timer according to the first configured grant configuration are updated by excluding a suspension period of the first configured grant configuration associated with the first numerology In an embodiment, the terminal device 950 may further comprise a first applying module 964 configured to, when the pending TB has been transmitted using the first configured grant configuration, the pending TB is to be transmitted using the second configured grant configuration, the first configured grant configuration is configured without repetition and the second configured grant configuration is configured with repetition, apply the repetition to transmit the pending TB in the second configured grant configuration.

In an embodiment, the terminal device 950 may further comprise a second applying module 965 configured to, when the pending TB has been transmitted using the first configured grant configuration, the pending TB is to be transmitted using the second configured grant configuration, the first configured grant configuration is configured with repetition and the second configured grant configuration is configured with repetition, apply the repetition to transmit the pending TB in the second configured grant configuration.

In an embodiment, the terminal device 950 may further comprise a third disabling module 966 configured to, when the pending TB has been transmitted using the first configured grant configuration, the pending TB is to be transmitted using the second configured grant configuration, the first configured grant configuration is configured with repetition and the second configured grant configuration is configured without repetition, disable the repetition to transmit the pending TB in the second configured grant configuration.

In an embodiment, the terminal device 950 may further comprise a second retransmitting module 968 configured to retransmit the pending TB using the first configured grant configuration associated with the first numerology.

In an embodiment, the terminal device 950 may further comprise a second transmitting module 969 configured to transmit, to a network node, a notification regarding the pending TB.

In an embodiment, the terminal device 950 may further comprise a third transmitting module 970 configured to transmit capability information of the terminal device. The capability information comprises a capability bit indicating whether the terminal device supports to transmit the pending TB using the second configured grant configuration associated with the second numerology.

Figure 9C:
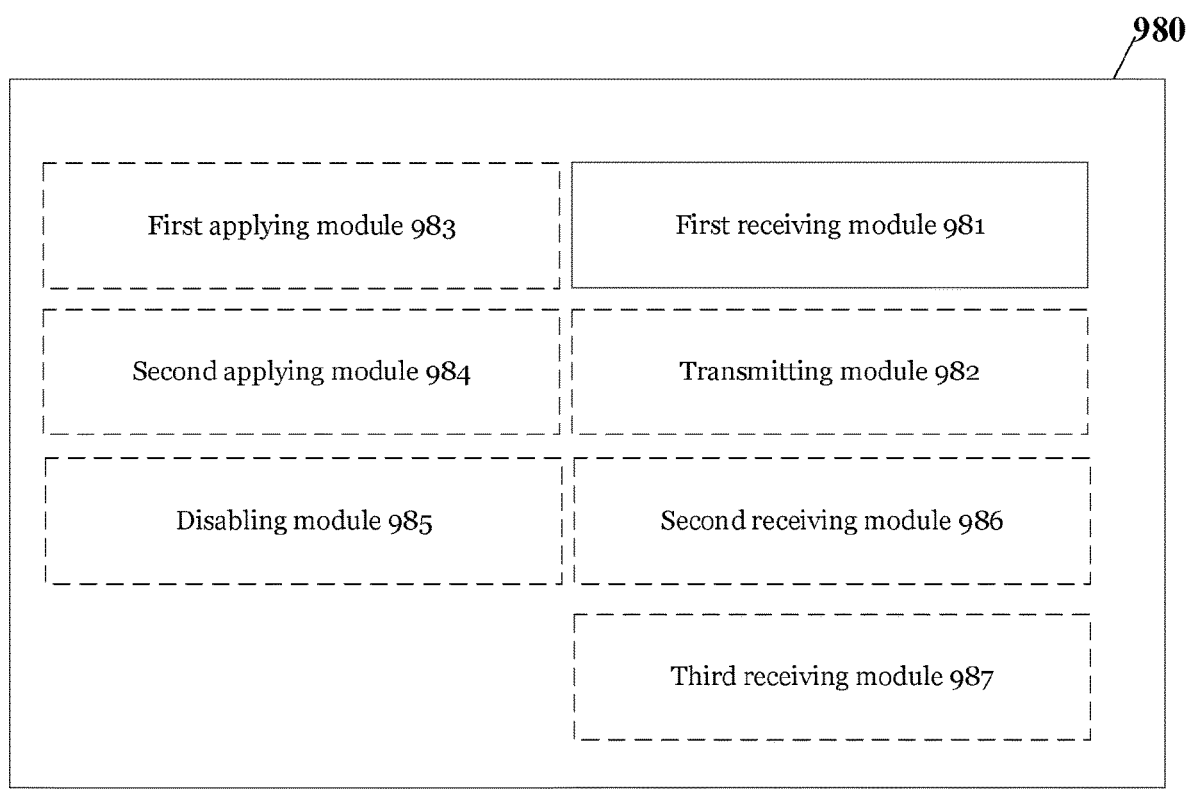
FIG. 9c is a block diagram showing a network node according to an embodiment of the disclosure.

FIG. 9c is a block diagram showing a network node 980 according to an embodiment of the disclosure. As shown, the network node 980 comprises a first receiving module 981. The receiving module 981 may be configured to receiving a pending transmission block, TB, from a terminal device. The pending TB is transmitted using a first configured grant configuration associated with a first numerology, or using a second configured grant configuration associated with a second numerology.

In an embodiment, the network node 980 may further comprise a transmitting module 982 configured to transmit a message indicating a change from the first numerology to the second numerology to the terminal device In an embodiment, the network node 980 may further comprise a first applying module 983 configured to, when the pending TB has been transmitted using the first configured grant configuration, the pending TB is to be transmitted using the second configured grant configuration, the first configured grant configuration is configured without repetition and the second configured grant configuration is configured with repetition, apply the repetition to receive the pending TB in the second configured grant configuration.

In an embodiment, the network node 980 may further comprise a second applying module 984 configured to, when the pending TB has been transmitted using the first configured grant configuration, the pending TB is to be transmitted using the second configured grant configuration, the first configured grant configuration is configured with repetition and the second configured grant configuration is configured with repetition, apply the repetition to receive the pending TB in the second configured grant configuration.

In an embodiment, the network node 980 may further comprise a disabling module 985 configured to, when the pending TB has been transmitted using the first configured grant configuration, the pending TB is to be transmitted using the second configured grant configuration, the first configured grant configuration is configured with repetition and the second configured grant configuration is configured without repetition, disable the repetition to receive the pending TB in the second configured grant configuration.

In an embodiment, the network node 980 may further comprise a second receiving module 986 configured to receive a notification regarding the pending TB.

In an embodiment, the network node 980 may further comprise a third receiving module 987 configured to receive capability information of the terminal device. The capability information comprises a capability bit indicating whether the terminal device supports to transmit the pending TB using the second configured grant configuration associated with the second numerology.

Embodiments herein afford many advantages, of which a non-exhaustive list of examples follows. In some embodiments herein, the proposed solution can enable a better configuration flexibility of handling configured resources. In some embodiments herein, the proposed solution can enable a better utilization of configured resources considering service QoS requirements. In some embodiments herein, the proposed solution can enable a better satisfaction of QoS requirements of different services that share the same configured resource. The embodiments herein are not limited to the features and advantages mentioned above. A person skilled in the art will recognize additional features and advantages upon reading the following detailed description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the terminal device and the network node may not need a fixed processor or memory. The introduction of virtualization technology and network computing technology may improve the usage efficiency of the network resources and the flexibility of the network.

Further, the exemplary overall commutation system including the terminal device and the network node such as base station will be introduced as below.

Embodiments of the present disclosure provide a communication system including a host computer including: processing circuitry configured to provide user data; and a communication interface configured to forward the user data to a cellular network for transmission to a terminal device. The cellular network includes a base station above mentioned, and/or the terminal device is above mentioned.

In embodiments of the present disclosure, the system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Figure 9D:
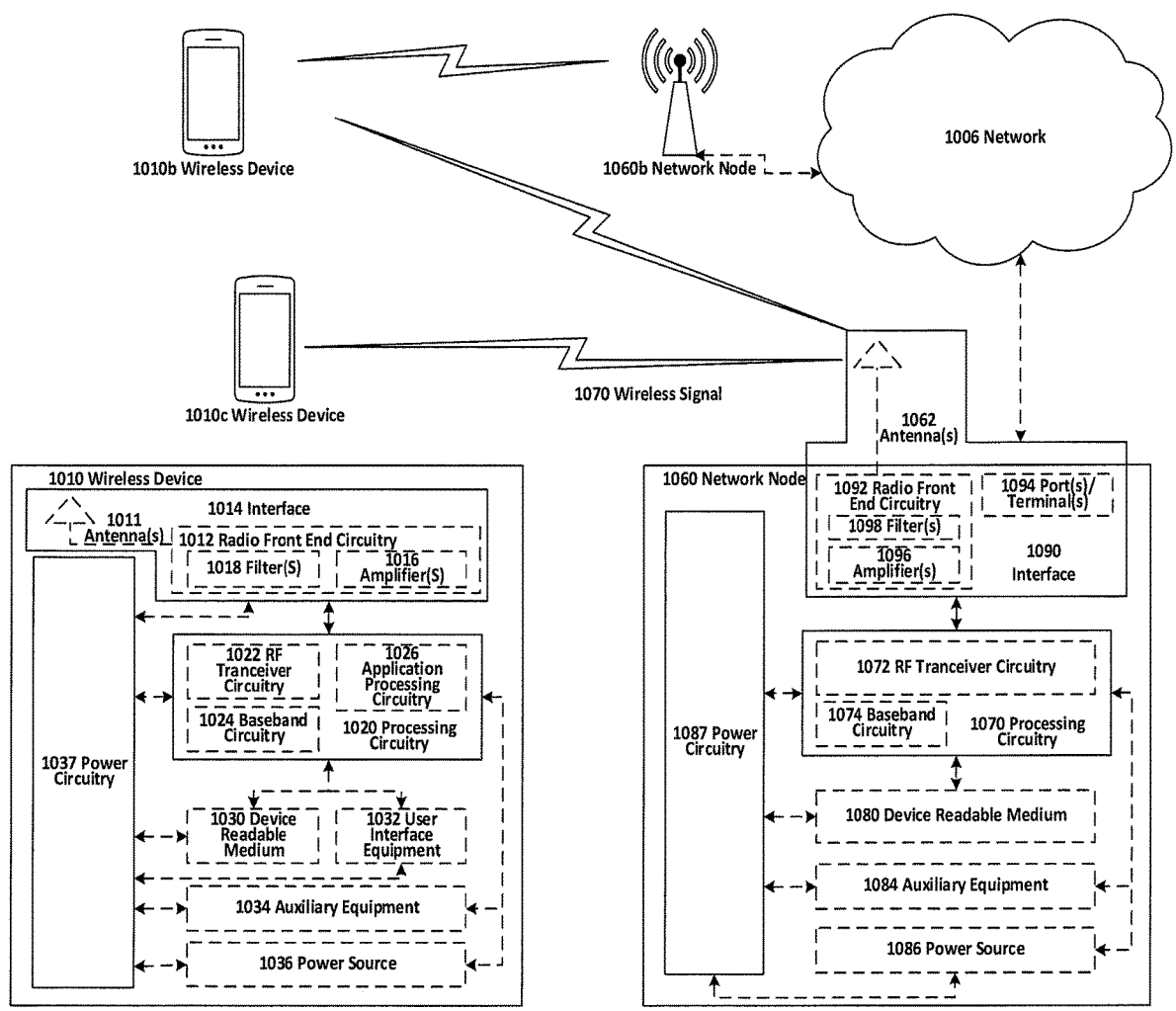
FIG. 9d is a schematic showing a wireless network in accordance with some embodiments.

FIG. 9d is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9d. For simplicity, the wireless network of FIG. 9d only depicts network 1006, network nodes 1060 (corresponding to network side node) and 1060*b*, and WDs (corresponding to terminal device) 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9*d*, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 9*d* may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being executed by a network node. Any information, data and/or signals may be received from a wireless device, another network node and/or any other network equipment. Similarly, antenna 1062, interface 1090, and/or processing circuitry 1070 may be configured to perform any transmitting operations described herein as being executed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 9d that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being executed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being executed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being executed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 10:
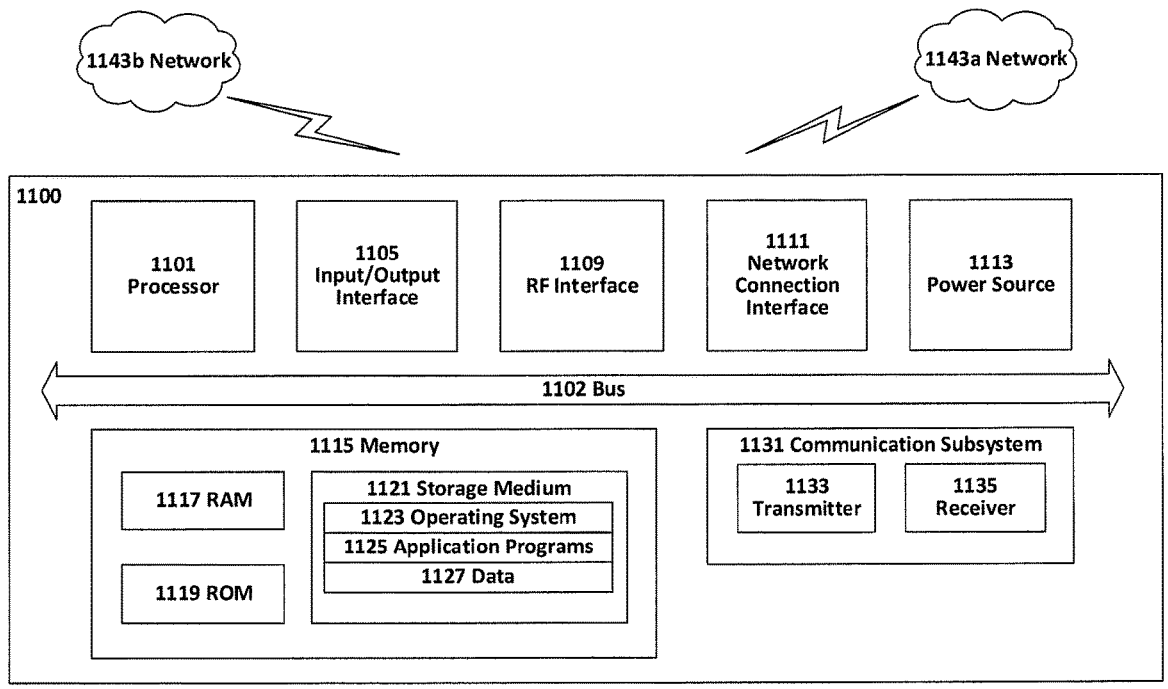
FIG. 10 is a schematic showing a user equipment in accordance with some embodiments.

FIG. 10 is a schematic showing a user equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 10, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 11:
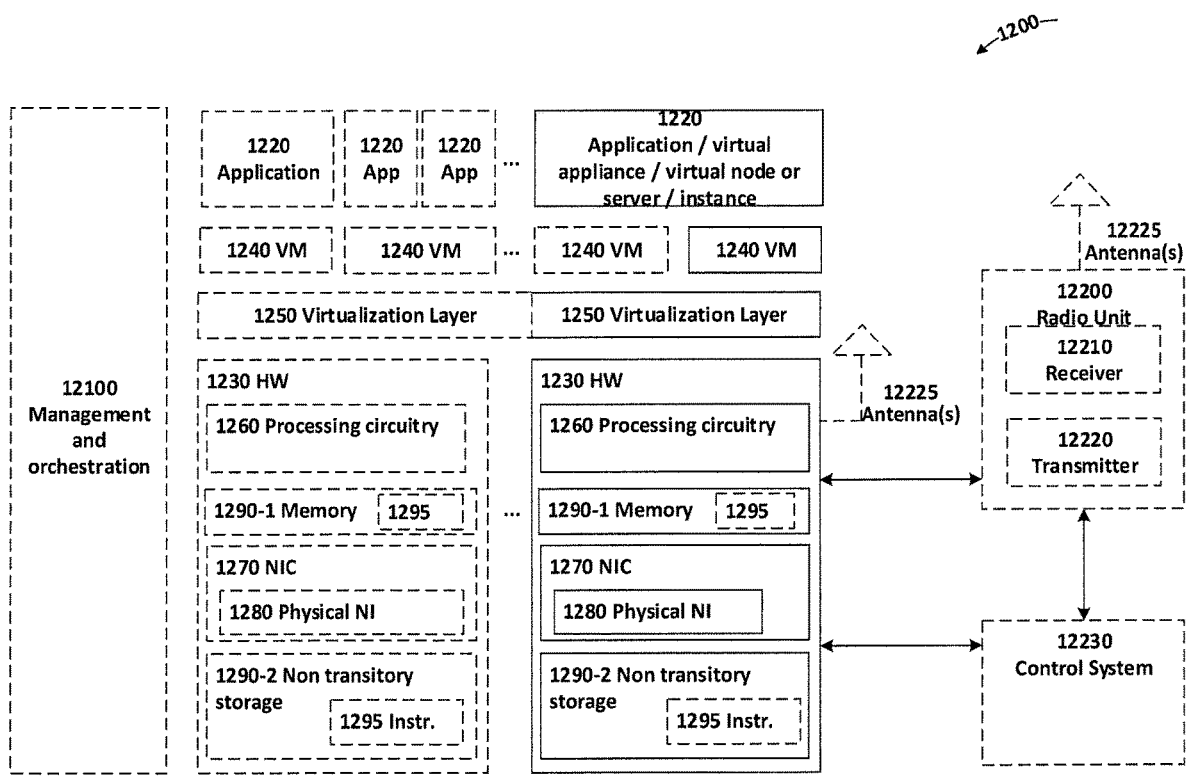
FIG. 11 is a schematic showing a virtualization environment in accordance with some embodiments.

FIG. 11 is a schematic showing a virtualization environment in accordance with some embodiments.

FIG. 11 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 11, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 11.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 12:
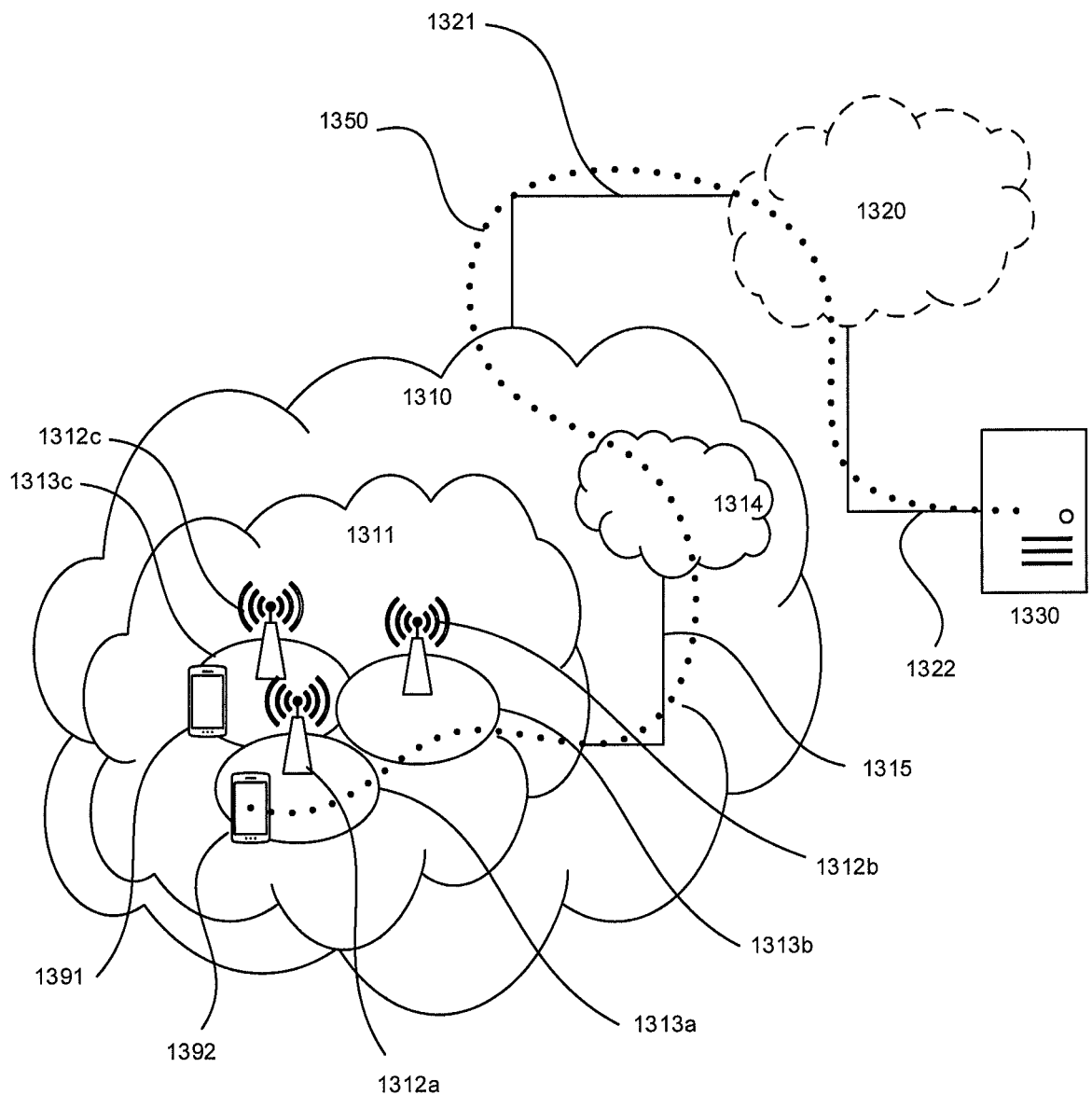
FIG. 12 is a schematic showing a telecommunication network connected via an intermediate network to a host computer in accordance with some embodiments.

FIG. 12 is a schematic showing a telecommunication network connected via an intermediate network to a host computer in accordance with some embodiments.

With reference to FIG. 12, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 12 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 13:
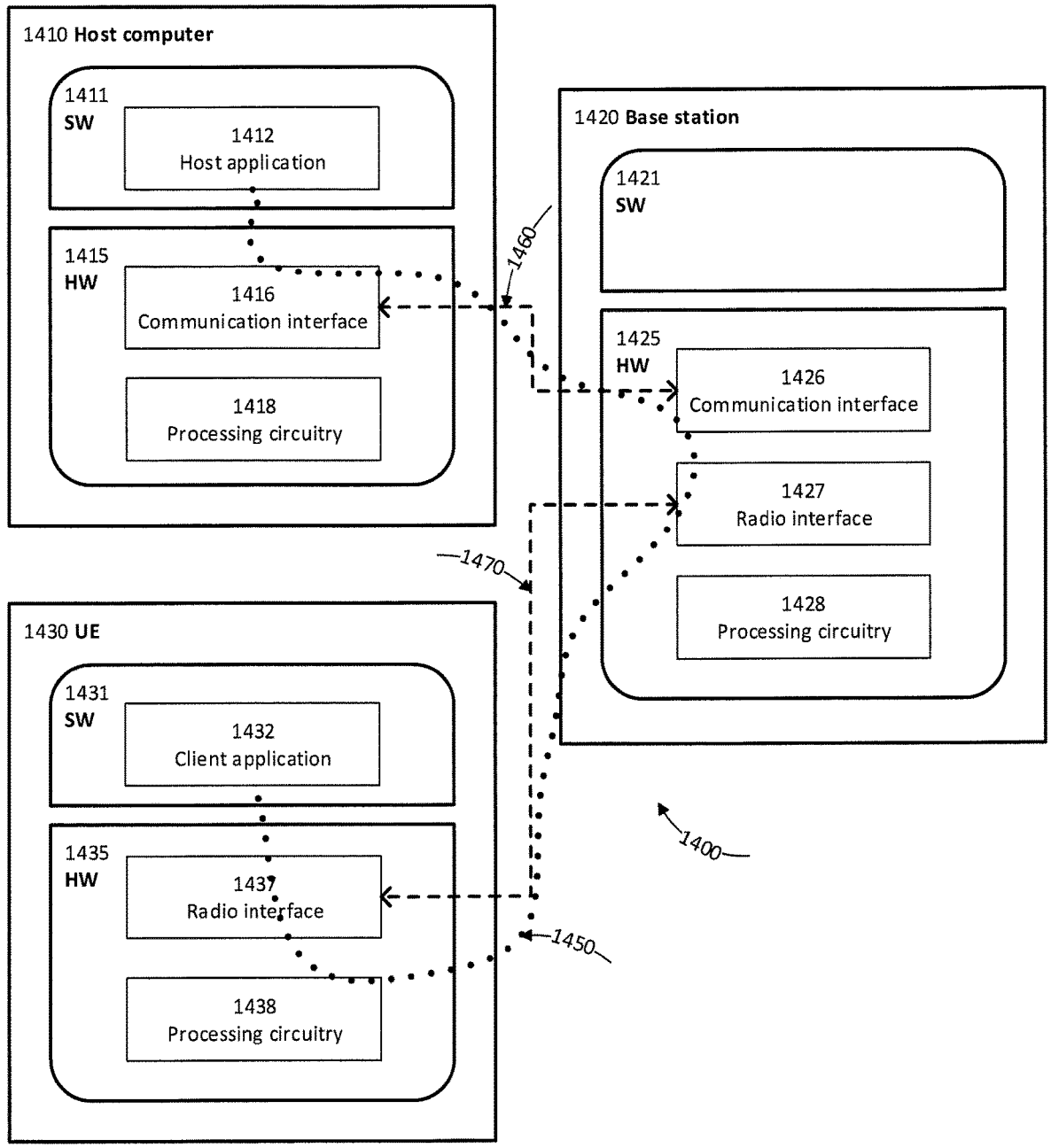
FIG. 13 is a schematic showing a host computer communicating via a base station with a user equipment over a partially wireless connection in accordance with some embodiments.

FIG. 13 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 13) served by base station 1420. Communication interface 1426 may be configured to facilitate connection 1460 to host computer 1410. Connection 1460 may be direct or it may pass through a core network (not shown in FIG. 13) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 13 may be similar or identical to host computer 1330, one of base stations 1312a, 1312b, 1312c and one of UEs 1391, 1392 of FIG. 12, respectively. This is to say, the inner workings of these entities may be as shown in FIG. 13 and independently, the surrounding network topology may be that of FIG. 12.

In FIG. 13, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 14:
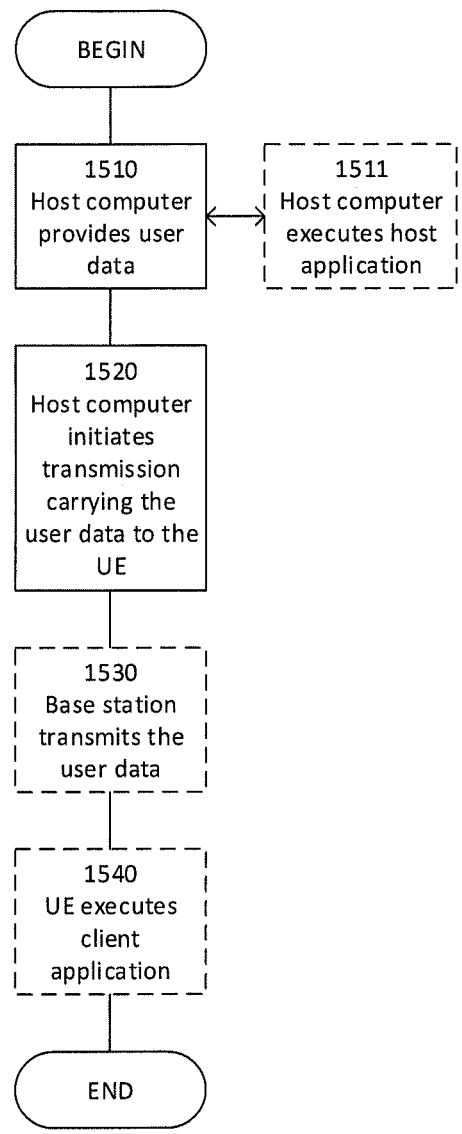
FIG. 14 is a schematic showing methods implemented in a communication system including a host computer, a base station and a user equipment in accordance with some embodiments.

FIG. 14 is a schematic showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 15:
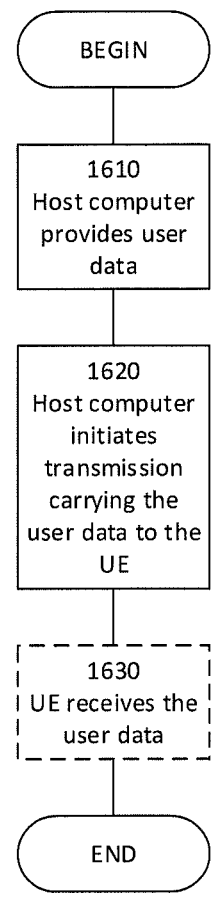
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 16:
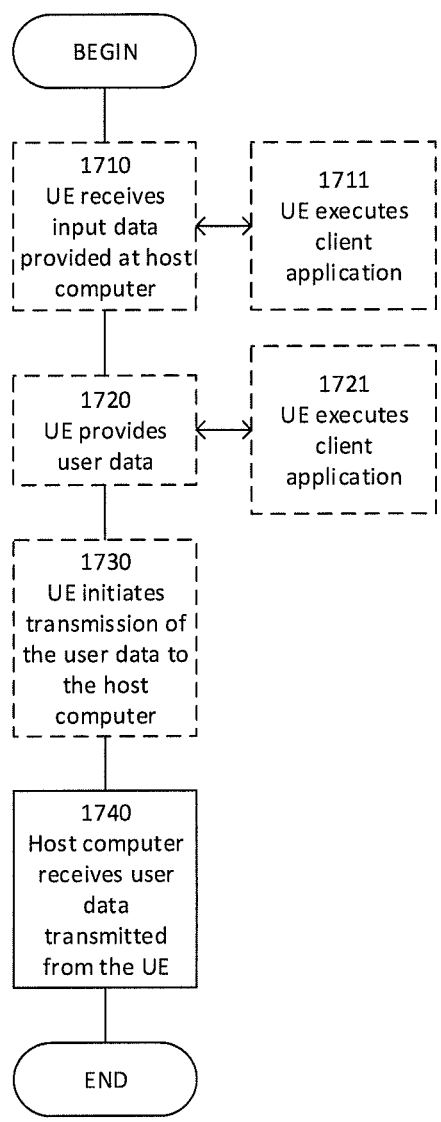
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 17:
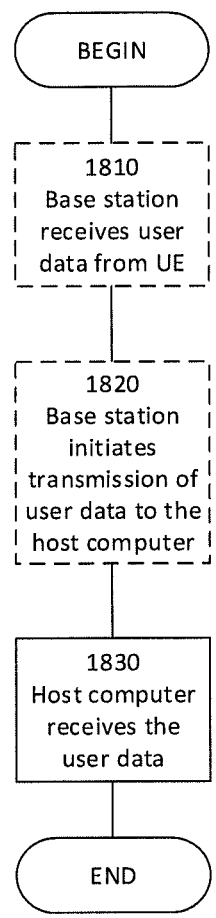
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method implemented at a terminal device, the method comprising:
   determining a change from a first numerology to a second numerology; and transmitting a pending transmission block, TB, using a first configured grant configuration associated with the first numerology, or using a second configured grant configuration associated with the second numerology,
   wherein the first configured grant configuration provides a first size for an initial TB, the second configured grant configuration provides a second size for the pending TB, and the first size is the same as the second size, or the first size is different from the second size, wherein the initial TB is transmitted using the first configured grant configuration associated with the first numerology.

2. The method according to claim 1, wherein the change from the first numerology to the second numerology is determined based on a received message or consistent listen before talk, LBT, failure, wherein the received message indicates the change from the first numerology to the second numerology.

3. The method according to claim 1, further comprising:
   performing rate matching to fit the second size when the first size is different from the second size.

4. The method according to claim 1, wherein after transmitting the pending TB using the second configured grant configuration associated with the second numerology, the method further comprises:
   clearing the first configured grant configuration.

5. The method according to claim 1, wherein the second configured grant configuration is able to fulfil a quality of service, QoS, requirement of the pending TB.

6. The method according to claim 1, wherein a hybrid automatic repeat request, HARQ, process associated with the pending TB is reused after changing from the first numerology to the second numerology, or a HARQ process associated with the pending TB is changed from a first HARQ process to a second HARQ process after changing from the first numerology to the second numerology.

7. The method according to claim 6, wherein when the HARQ process associated with the pending TB is changed from the first HARQ process to the second HARQ process after changing from the first numerology to the second numerology, the method further comprises:
   dropping the pending TB and triggering an upper layer retransmission; or
   copying the pending TB from the first HARQ process to the second HARQ process and dropping the pending TB in the first HARQ process.

8. The method according to claim 1, further comprising:
   for the pending TB, stopping a first timer and a second timer according to the first configured grant configuration which needs to be cleared, wherein the first timer is configured to indicate a maximum amount of time for the terminal device to transmit and retransmit a TB associated with a hybrid automatic repeat request, HARQ, process using a configured grant and the second timer is configured to indicate an autonomous retransmission time interval of configured grant for the HARQ process; and/or
   for the pending TB, restarting the first timer and the second timer according to the second configured grant configuration,
   wherein timer values of the first timer and the second timer according to the second configured grant configuration are set according to one of:
      the timer values of the first timer and the second timer according to the second configured grant configuration are set as corresponding values configured in the second configured grant configuration; or
      the timer values of the first timer and the second timer according to the second configured grant configuration are set as the corresponding values configured in the second configured grant configuration minus corresponding elapsed time values of the first timer and the second timer according to the first configured grant configuration, or further comprising:
         for the pending TB, stopping a first timer and a second timer according to the first configured grant configuration which needs to be suspended, wherein the first timer is configured to indicate a maximum amount of time for the terminal device to transmit and retransmit a TB associated with a hybrid automatic repeat request, HARQ, process using a configured grant and the second timer is configured to indicate an autonomous retransmission time interval of configured grant for the HARQ process; and/or
for the pending TB, restarting the first timer and the second timer after the suspended first configured grant configuration is resumed,
wherein respective timer values of the first timer and the second timer according to the first configured grant configuration are updated by excluding a suspension period of the first configured grant configuration associated with the first numerology.

9. The method according to claim 1, further comprising:
when the pending TB has been transmitted using the first configured grant configuration, the first configured grant configuration is configured without repetition and the second configured grant configuration is configured with repetition, applying the repetition to transmit the pending TB in the second configured grant configuration, wherein in the second configured grant configuration, the pending TB is transmitted based on one of:
a configured repetition number in the second configured grant configuration;
a repetition number calculated by the configured repetition number in the second configured grant configuration minus one;
a repetition number configured by a network node; or
a repetition number configured by the terminal device;
or further comprising:
when the pending TB has been transmitted using the first configured grant configuration, the first configured grant configuration is configured with repetition and the second configured grant configuration is configured with repetition, applying the repetition to transmit the pending TB in the second configured grant configuration,
wherein in the second configured grant configuration, the pending TB is transmitted based on one of:
a configured repetition number in the second configured grant configuration; or
a repetition number calculated by the configured repetition number in the second configured grant configuration minus a repetition number that the pending TB has been transmitted in the first configured grant configuration;
or further comprising:
when the pending TB has been transmitted using the first configured grant configuration, the first configured grant configuration is configured with repetition and the second configured grant configuration is configured without repetition, disabling the repetition to transmit the pending TB in the second configured grant configuration.

10. The method according to claim 1, wherein the pending TB is transmitted using the first configured grant configuration associated with the first numerology when the first configured grant configuration is a first type of configured grant configuration, wherein the first type of configured grant configuration comprises configured grant Type 1.

11. The method according to claim 10, wherein after the change from the first numerology to the second numerology has completed, the method further comprises:
retransmitting the pending TB using the first configured grant configuration associated with the first numerology.

12. The method according to claim 1, further comprising:
transmitting, to a network node, a notification regarding the pending TB, wherein the notification regarding the pending TB comprises at least one of:
a size of the pending TB;
information regarding a hybrid automatic repeat request, HARQ, process associated with the pending TB in the first configured grant configuration which was cleared;
information regarding the HARQ process associated with the pending TB in the first configured grant configuration which was suspended;
information regarding the second configured grant configuration, wherein the pending TB is to be transmitted using the second configured grant configuration; or
information regarding the HARQ process to be used for retransmission of the pending TB after the change from the first numerology to the second numerology.

13. The method according to claim 12, wherein the notification regarding the pending TB is transmitted to the network node via at least one of:
a random access channel, RACH, message;
a physical uplink control channel, PUCCH, transmission;
a physical uplink shared channel, PUSCH, based transmission; or
a sounding reference signal, SRS, transmission.

14. The method according to claim 1, wherein the terminal device is configured with multiple configured grant configurations, and at least one of the configured grant configuration is associated with at least one numerology.

15. The method according to claim 1, wherein an association between a configured grant configuration and a numerology is configured explicitly or inexplicitly.

16. The method according to claim 1, wherein an index of a numerology is included in a configured grant configuration.

17. The method according to claim 1, wherein
one or more configured grant configurations are configured for a bandwidth part, BWP, and the BWP is configured with at least one numerology; and/or
one or more configured grant configurations are configured for a cell and the cell is configured with at least one numerology; and/or
a BWP segment is configured with at least one numerology.

18. The method according to claim 1, wherein numerology comprises at least one of:
a sub-carrier spacing, SCS,
a symbol duration, or
a cyclic prefix, CP, length.

19. The method according to claim 1, further comprising:
transmitting capability information of the terminal device, wherein the capability information comprises a capability bit indicating whether the terminal device supports to transmit the pending TB using the second configured grant configuration associated with the second numerology.

20. A terminal device comprising:
a processor; and
a memory, the memory containing instructions executable by the processor, whereby the terminal device is operative to:
determine a change from a first numerology to a second numerology; and
transmit a pending transmission block, TB, using a first configured grant configuration associated with the first numerology, or using a second configured grant configuration associated with the second numerology.

\* \* \* \* \*